United States Patent [19]

Matama

[11] Patent Number: 5,739,922
[45] Date of Patent: Apr. 14, 1998

[54] IMAGE PROCESSING METHOD AND APPARATUS FOR REDUCING THE EFFECT OF IMAGE INFORMATION HAVING PERCEPTIBLE FILM GRAININESS

[75] Inventor: Tohru Matama, Kanagawa-ken, Japan

[73] Assignee: Fuji Photo Film Co., Ltd., Kanagawa-ken, Japan

[21] Appl. No.: 598,918

[22] Filed: Feb. 9, 1996

[30] Foreign Application Priority Data

Feb. 9, 1995 [JP] Japan ................... 7-021842
Dec. 25, 1995 [JP] Japan ................... 7-337510

[51] Int. Cl.$^6$ ............................ G06K 9/40; H04N 1/40
[52] U.S. Cl. ............ 358/447; 358/463; 358/527; 358/532; 382/254; 382/260
[58] Field of Search ............... 358/527, 538, 358/533, 532, 531, 530, 518, 515, 504, 447, 445, 522, 463; 382/271, 272, 273, 274, 275, 254, 260, 263, 264

[56] References Cited

U.S. PATENT DOCUMENTS

| | | | |
|---|---|---|---|
| 3,582,887 | 6/1971 | Guthrie | 382/271 |
| 3,973,239 | 8/1976 | Kakumoto | 382/271 |
| 4,268,861 | 5/1981 | Schreiber | 358/138 |
| 4,463,375 | 7/1984 | Macousici | 358/111 |
| 4,812,903 | 3/1989 | Wagensonner et al. | 358/80 |
| 4,896,222 | 1/1990 | Fukai | 358/447 |
| 5,513,280 | 4/1996 | Kawamura | 382/266 |
| 5,526,446 | 6/1996 | Adelson et al. | 382/275 |
| 5,594,807 | 1/1997 | Liu | 382/128 |
| 5,606,630 | 2/1997 | Maeda et al. | 382/254 |

FOREIGN PATENT DOCUMENTS

| | | |
|---|---|---|
| 63-26783 | 2/1988 | Japan . |
| 1277061 | 11/1989 | Japan . |
| 3502975 | 7/1991 | Japan . |

OTHER PUBLICATIONS

"Image Analysis Handbook," the publishing circle of the University of Tokyo, supervised by Mikio Takagi and Yokyu Shimoda, p. 549 (No Translation).

*Primary Examiner*—Edward L. Coles, Sr.
*Assistant Examiner*—Madeleine A. V. Nguyen

[57] ABSTRACT

In an image processing method for carrying out processing on an image signal, which represents a given image, the image signal is separated into low frequency components, middle frequency components, and high frequency components. Emphasis and restriction processing is carried out, with which the high frequency components are emphasized and the middle frequency components are restricted. The high frequency components and the middle frequency components, which have been obtained from the emphasis and restriction processing, and the low frequency components are combined with one another, and a processed image signal is thereby obtained. The image sharpness is thus emphasized, and noise components due to film graininess are removed, such that a reproduced image having good image quality may be obtained.

62 Claims, 17 Drawing Sheets

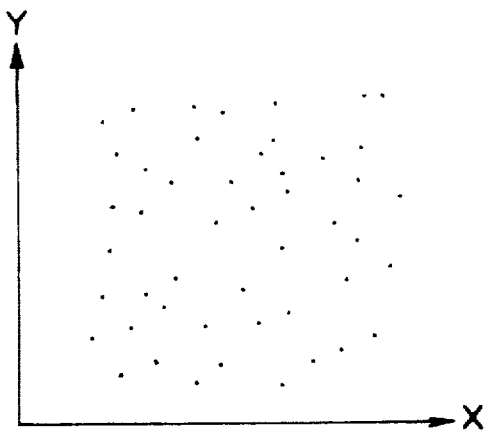
F I G.10A
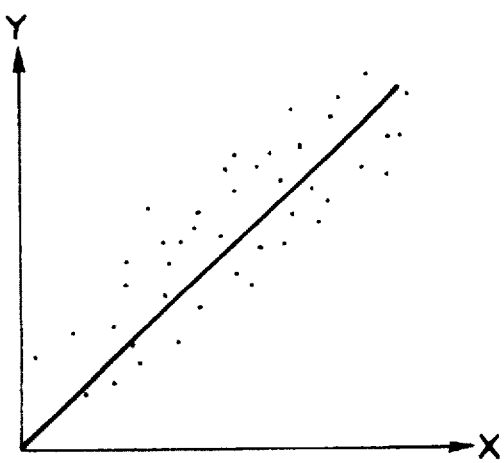
F I G.10B
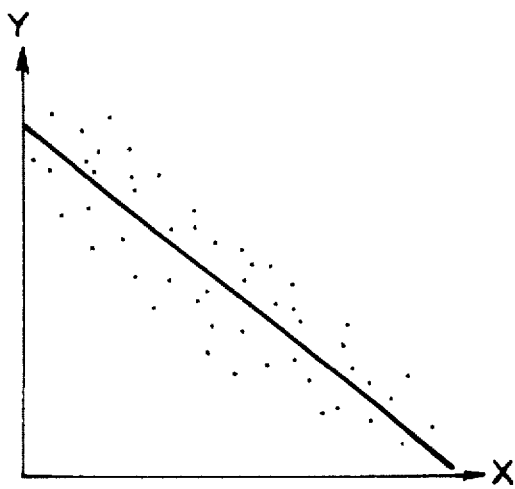
F I G.10C

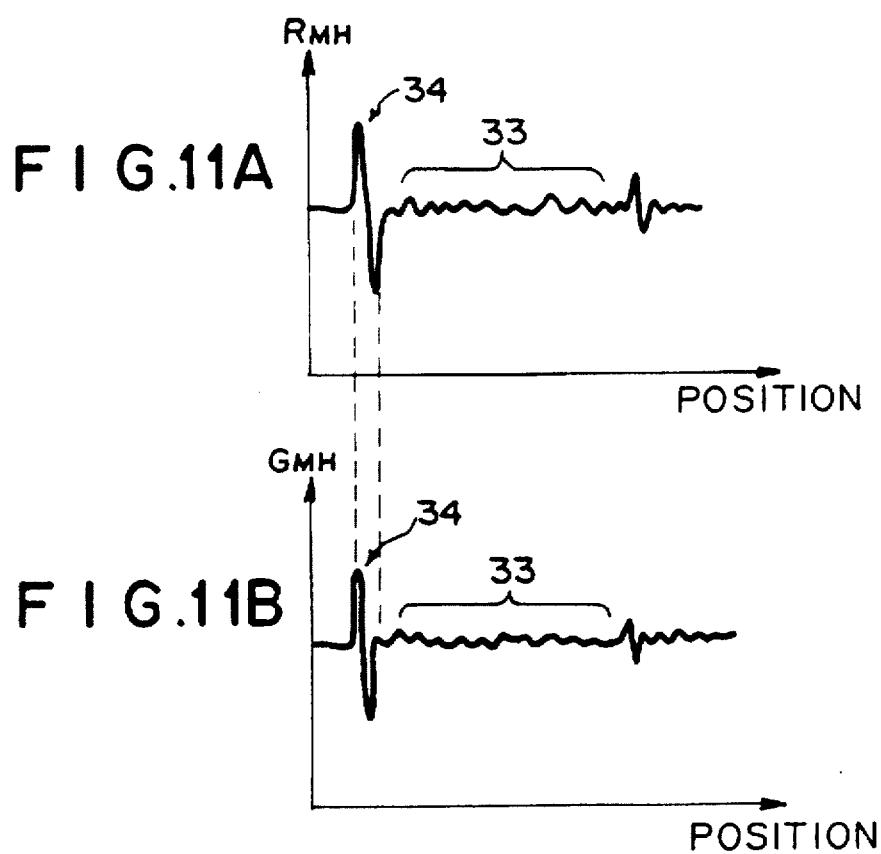
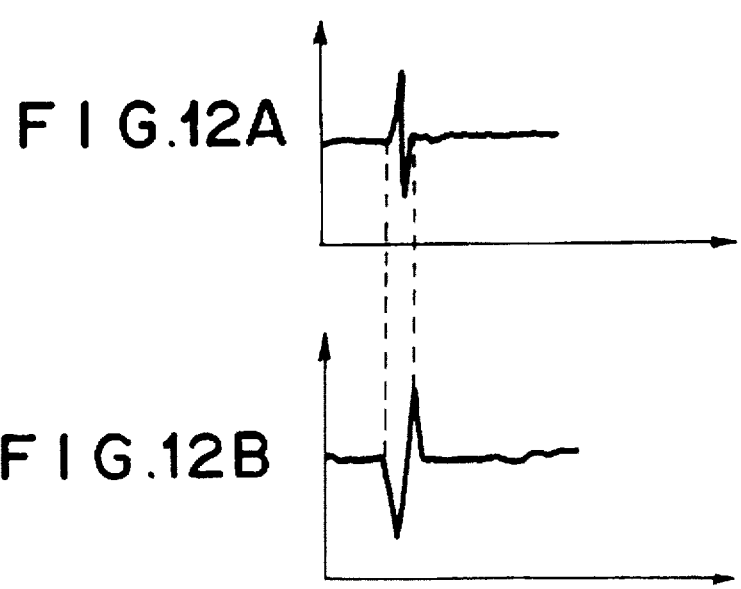

F I G. 21
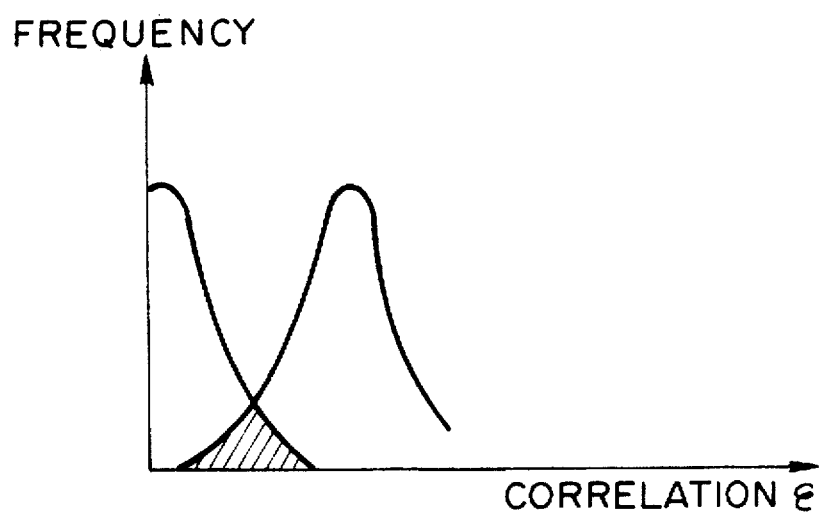
F I G. 23
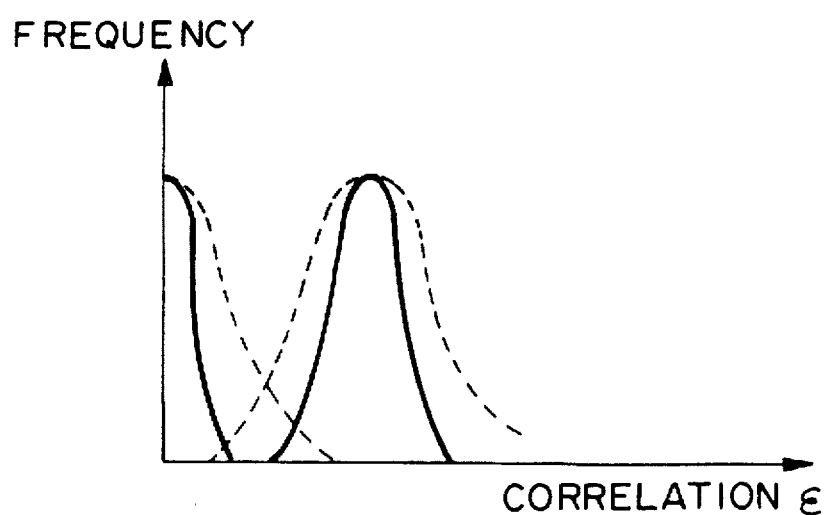

IMAGE PROCESSING METHOD AND APPARATUS FOR REDUCING THE EFFECT OF IMAGE INFORMATION HAVING PERCEPTIBLE FILM GRAININESS

BACKGROUND OF THE INVENTION

1. Field of the Invention

This invention relates to an image processing method and apparatus. This invention particularly relates to an image processing method and apparatus, wherein image processing is carried out on color image signals, which have been obtained by reading out a color image.

2. Description of the Prior Art

With techniques for reading out a color image and reproducing the color image as a visible image, a color image having been recorded on photographic film, or the like, is photoelectrically read out with a sensor, such as a charge coupled device (CCD), and red (R), green (G), and blue (B) three primary color image signals are thereby obtained. Various image processing operations are carried out on the image signals, and a visible image is reproduced on a recording material from the image signals, which have been obtained from the image processing. Systems for carrying out such techniques have been proposed, wherein a pre-scanning operation and a fine scanning operation are carried out. In the pre-scanning operation, a color image is scanned at coarse scanning intervals and is read out photoelectrically. In this manner, the image information concerning the color image is approximately ascertained. Various parameters to be used in carrying out the image processing are set in accordance with the information, which has been obtained from the pre-scanning operation. Thereafter, the fine scanning operation is carried out. In the fine scanning operation, the color image is scanned at fine scanning intervals, and the R, G, and B three color image signals to be used for reproducing the visible image are obtained.

As the techniques for carrying out the image processing in the systems described above, for example, various techniques for emphasizing the image sharpness by carrying out the image processing on the image signal, which represents a given image, have been proposed. As one of such techniques, a technique for emphasizing the image sharpness by carrying out unsharp mask processing on the image signal has been proposed in, for example, "Image Analysis Handbook," the publishing circle of the University of Tokyo, supervised by Mikio Takagi and Yokyu Shimoda, p. 549.

Also, a processing technique for restricting the graininess of a reproduced image and emphasizing the image sharpness has been proposed in, for example, U.S. Pat. No. 4,812,903. With the proposed processing technique, R, G, and B three color image signals are separated into a luminance signal and chrominance signals. Nonlinear processing is carried out on low frequency components of the luminance signal. Also, processing for emphasizing high frequency components of the luminance signal is carried out. Thereafter, the luminance signal, which has been obtained from the processing, and the chrominance signals are combined together.

Further, a different image processing technique for emphasizing the image sharpness and restricting the image graininess has been proposed in, for example, Japanese Unexamined Patent Publication No. 63 (1988)-26783. With the proposed image processing technique, a luminance signal and chrominance signals (representing the hue, the saturation, or the like) are extracted from image signals, which represent a color image. Spatial filter processing is carried out on the luminance signal, and spatial general information and spatial detail information are thereby carried out. Predetermined emphasis processing is then carried out on the spatial general information and the spatial detail information. Thereafter, the spatial general information and the spatial detail information, which have been obtained from the emphasis processing, are combined together, and a new luminance signal is thereby obtained. The new luminance signal and the chrominance signals are then combined together and converted into predetermined color image signals. With the proposed image processing technique, a processed image can be obtained, which has been subjected to natural sharpness emphasis processing such that little change in the color tone, or the like, may occur, and in which the graininess has been restricted.

Furthermore, as for ordinary analog photographs, it has been known that, in cases where a photograph is enlarged from 35 mm film, or the like, to a size of 203 mm×254 mm, 254 mm×305 mm, or larger, patterns of particles in the film become perceptible, depending upon colors, and the image quality becomes bad. Therefore, an image processing technique for restricting the graininess of the output image has been proposed in, for example, Japanese Unexamined Patent Publication No. 1 (1989)-277061. With the proposed image processing technique a predetermined color portion, such as a flesh-color portion, is extracted from a color image. In cases where the area of the predetermined color portion having thus been extracted becomes equal to a predetermined area or larger, noise removal processing is carried out on the predetermined color portion. In this manner, boundary lines between particles in the flesh-color region are removed, and the graininess of the output image is thereby restricted.

Also, a technique for emphasizing the image sharpness has been proposed in, for example, Japanese Patent Application Publication No. 3 (1991)-502975. With the proposed technique, the image sharpness is emphasized by changing the value of a coefficient K in the formula for unsharp mask processing, which is shown below, in accordance with a characteristic portion of the image.

$$S'=S_{org}+K \cdot (S_{org}-S_{us})$$

wherein $S_{org}$ represents the original image signal, and $S_{us}$ represents the unsharp mask signal. Specifically, with the proposed technique, local area limited variance values, which are plotted with respect to the frequency of occurrence, are calculated as for a flat portion of the image, in which the level of noise due to the film graininess is high, a texture portion of the image, and an edge portion of the image. The value of the coefficient K is set as functions of the local area limited variance values. More specifically, as for an ordinary image, the local area limited variance values of the flat portion, the texture portion, and the edge portion of the image respectively take values 51, 52, and 53 shown in FIG. 15. Therefore, the value of the coefficient K for the image signal representing the flat portion is calculated in accordance with the local area limited variance values 51. Also, the value of the coefficient K for the image signal representing the texture portion is calculated in accordance with the local area limited variance values 52. Further, the value of the coefficient K for the image signal representing the edge portion is calculated in accordance with the local area limited variance values 53. The value of the coefficient K is set to be small for the flat portion is set to be large for each of the texture portion and the edge portion, such that an image may be obtained, in which noise has been restricted and the sharpness has been emphasized.

With the unsharp mask processing described above, the sharpness can be emphasized. However, the roughness due to the film graininess is also emphasized together with the emphasis of the sharpness. As a result, a reproduced image having good image quality and little noise cannot be obtained.

With the technique proposed in U.S. Pat. No. 4,812,903 or Japanese Unexamined Patent Publication No. 63 (1988)-26783, wherein the high frequency components of colors are not emphasized, the rough feeling due to the film graininess can be restricted to be lower than with the unsharp mask processing. However, roughness of the luminance components due to the film graininess still remains unremoved.

With the technique proposed in Japanese Unexamined Patent Publication No. 1 (1989)-277061, noise due to the film graininess can be removed. However, the image sharpness cannot be emphasized and, as a result, a reproduced image which is easy to view cannot be obtained.

With the technique proposed in Japanese Patent Application Publication No. 3 (1991)-502975, noise due to the film graininess can be restricted, and the sharpness can be emphasized. However, the local area limited variance values of the texture portion, the edge portion, or the like, in which the amplitude of the image signal is small, cannot be easily separated from the local area limited variance values of the flat portion. Therefore, it often occurs that the texture and the edge, which are to be reproduced with a high sharpness, are restricted in the same manner as that for noise in the flat portion.

SUMMARY OF THE INVENTION

The primary object of the present invention is to provide an image processing method, with which the sharpness of a color image is emphasized, and noise components due to film graininess are removed, such that a reproduced image having good image quality may be obtained.

Another object of the present invention is to provide an apparatus for carrying out the image processing method.

The present invention provides an image processing method for carrying out processing on an image signal, which represents a given image, comprising the steps of:

i) separating the image signal into low frequency components, middle frequency components, and high frequency components, ii) carrying out emphasis and restriction processing, with which the high frequency components are emphasized and the middle frequency components are restricted, and iii) combining the high frequency components and the middle frequency components, which have been obtained from the emphasis and restriction processing, and the low frequency components with one another, a processed image signal being thereby obtained.

The present invention also provides an image processing apparatus for carrying out processing on an image signal, which represents a given image, comprising:

i) a separation unit for separating the image signal into low frequency components, middle frequency components, and high frequency components, ii) an emphasis and restriction processing unit for carrying out emphasis and restriction processing, with which the high frequency components are emphasized and the middle frequency components are restricted, and iii) a composition unit for combining the high frequency components and the middle frequency components, which have been obtained from the emphasis and restriction processing, and the low frequency components with one another, a processed image signal being thereby obtained.

FIG. 3 is a graph showing how low, middle, and high frequency components are distributed. The term "low frequency components, middle frequency components, and high frequency components of an image signal" as used herein means the frequency components, which are distributed in the patterns shown in FIG. 3. The middle frequency components are distributed such that they may have a peak in the vicinity of $\frac{1}{2}$ of the Nyquist frequency of the output in the reproduction of a visible image from the signal having been processed. The low frequency components are distributed such that they may have a peak at a frequency, at which the Nyquist frequency of the output becomes equal to 0. The high frequency components are distributed such that they may have a peak at the Nyquist frequency of the output. At each frequency, the sum of the low, middle, and high frequency components becomes equal to 1.

The image processing method and apparatus in accordance with the present invention should preferably be constituted such that, after the separation, luminance components may be extracted from the high frequency components and the middle frequency components, and the emphasis and restriction processing and the combining may be carried out in accordance with only the luminance components.

Also, the image processing method and apparatus in accordance with the present invention should preferably be constituted such that a specific color region may be extracted from the given image, and the emphasis and restriction processing may be carried out such that the middle frequency components, which correspond to the specific color region, may be restricted even further.

Further, the image processing method and apparatus in accordance with the present invention should preferably be constituted such that, after the separation, a calculation may be made to find a rating value of the middle frequency components and/or the high frequency components and the emphasis and restriction processing may be carried out such that the middle frequency components corresponding to picture elements, which are associated with the rating values smaller than a predetermined threshold value, may be more restricted than the middle frequency components corresponding to picture elements, which are associated with the rating values larger than the predetermined threshold value, are.

In such cases, the high frequency components corresponding to the picture elements, which are associated with the rating values smaller than the predetermined threshold value, should preferably be less emphasized than the high frequency components corresponding to the picture elements, which are associated with the rating values larger than the predetermined threshold value.

The term "rating value" as used herein means a value, such as a correlation value between at least a single set of two colors, which are among red, green, and blue three colors, as will be described later, or a local area limited variance value of the frequency components of the image signal.

The rating value should preferably be a correlation value between at least a single set of two colors, which are among red, green, and blue three colors, the correlation value being calculated from the middle frequency components and/or the high frequency components, which are of the respective colors and correspond to the same picture element.

Also, the rating value may be subjected to a filter processing with a median filter, and thereafter the emphasis and restriction processing may be carried out by using the predetermined threshold value and in accordance with the rating value, which has been obtained from the filter processing with the medium filter.

Further, the calculation of the middle frequency components and/or the high frequency components and the calculation of the rating value may be carried out respectively in accordance with different colors, which are among red, green, and blue three colors.

Furthermore, the degrees of the emphasis and the restriction in the emphasis and restriction processing should preferably be determined by being selected from a plurality of emphasis and restriction processing conditions, which have been determined previously in accordance with image reproducing conditions in the reproduction of a visible image from the processed image signal.

The term "image reproducing conditions" as used herein means the conditions, which affect the characteristics of the reproduced visible image, such as the kind of the recording medium on which the given image was recorded (e.g., negative film or reversal film), the size of the print on which the visible image is reproduced, or a correction amount which is specified by an operator from a keyboard such that a desired image processing may be carried out.

In an image signal representing an ordinary image, the components, which have effects upon the sharpness of the reproduced image, are the high frequency components of the image signal. The film graininess, which appears as the roughness in the reproduced image, is contained primarily in the middle frequency components. The present invention is based on such findings.

Specifically, with the image processing method and apparatus in accordance with the present invention, the image signal is separated into the low frequency components, the middle frequency components, and the high frequency components. The emphasis and restriction processing is then carried out such that the high frequency components may be emphasized, and the middle frequency components may be restricted. Thereafter, the high frequency components and the middle frequency components, which have been obtained from the emphasis and restriction processing, and the low frequency components are combined with one another, and the processed image signal is thereby obtained. Therefore, from the processed image signal, a visible image can be reproduced in which the sharpness has been emphasized and the roughness due to the film graininess has been restricted. Accordingly, a reproduced visible image having good image quality can be obtained.

Also, as for color image signals representing a color image, in cases where the middle and high frequency components, which are of the R, G, and B three colors, are converted to the YIQ base, the I components and the Q components, which are the chrominance components, have little level of component in the cases of images of ordinary objects. Therefore, the I components and the Q components can be regarded as being the components constituting the roughness of color due to the film graininess. Accordingly, the emphasis and restriction processing and the aforesaid combining of the frequency components are carried out only on the Y components, which are the luminance components of the high frequency components and the middle frequency components having been separated from the image signals. In this manner, the roughness of color due to the film graininess can be restricted, and a reproduced image having good image quality can be obtained.

Further, as for a color image, it often occurs that the roughness of color due to the film graininess becomes perceptible in the cases of a specific color, such as flesh color or sky blue. Therefore, a specific color region may be extracted from the given image, and the emphasis and restriction processing may be carried out such that the middle frequency components, which correspond to the specific color region, may be restricted even further. In this manner, the roughness of color can be restricted in the color region, in which the roughness is apt to become perceptible.

The correlation value and the local area limited variance value are small in an image signal region corresponding to an approximately uniform image portion (hereinbelow referred to as the "flat portion"), in which the roughness due to the film graininess is perceptible. This is because, in the flat portion, the signal value changes at random. Also, the correlation value is large in an image signal region corresponding to an edge portion, a texture portion, or the like, of the image, in which the signals of the respective colors take approximately the same value. Further, in the image signal region corresponding to the edge portion, the texture portion, or the like, the local area limited variance value of the image signal becomes large. Therefore, in cases where the calculated rating value, such as the correlation value or the local area limited variance value, is smaller than the predetermined threshold value, the picture element, which is associated with the rating value smaller than the predetermined threshold value, can be regarded as being located in the flat portion. The middle frequency component corresponding to the picture element, which is associated with the rating value smaller than the predetermined threshold value, may then be more restricted than the middle frequency components corresponding to the other picture elements are. In this manner, the graininess can be restricted even further with respect to the region, in which the roughness is apt to become perceptible.

In cases where the calculated rating value is smaller than the predetermined threshold value, the degree of emphasis of the high frequency component corresponding to the picture element, which is associated with the rating value smaller than the predetermined threshold value, may be set to be lower than the degree of emphasis of the high frequency components corresponding to the other picture elements. In this manner, it is possible to prevent the problems from occurring in that, in cases where the degree of emphasis of the high frequency components is set to be high, the graininess due to the luminance components is emphasized in the flat portion of the image.

In cases where the middle frequency components and/or the high frequency components of the color image signals are separated into signals of the R, G, and B three colors and a calculation is made to find the correlation value between the colors, the correlation value is small in an image signal region corresponding to an approximately uniform image portion (hereinbelow referred to as the "flat portion"), in which the roughness due to the film graininess is perceptible. This is because, in the flat portion, the signal value changes at random regardless of color. Also, the correlation value is large in an image signal region corresponding to an edge portion, a texture portion, or the like, of the image, in which the signals of the respective colors take approximately the same value. Therefore, the middle frequency components and/or the high frequency components of the color image signals may be separated into signals of the R, G, and B three colors, and a calculation may be made to find the correlation value between at least a single set of two colors, which are among the R, G, and B three colors. The aforesaid processing with the threshold value may then be carried out in accordance with the calculated correlation value. In this manner, the graininess can be restricted even further with respect to the region, in which the roughness is apt to become perceptible. Also, it is possible to prevent the problems from occurring in that, in cases where the degree of emphasis of the high frequency components is set to be high, the graininess due to the luminance components is emphasized in the flat portion of the image.

Also, when the rating value described above is calculated, it is not possible to clearly separate the graininess components and the edge components in the image from each other. Therefore, as a result of the emphasis and restriction processing, graininess components associated with a comparatively large rating value are emphasized, and graininess components associated with a comparatively small rating value are restricted. The graininess components associated with a comparatively large rating value have a large signal amplitude, and therefore the high level of graininess remains in a spatially non-dense form. Therefore, in cases where the rating value is subjected to the filter processing with the median filter, local noise of the rating value can be eliminated, and the width of the distribution of the rating values can be kept small. Accordingly, the separation of the middle frequency components, which are regarded as corresponding to the flat portion, and the high frequency components, which are regarded as corresponding to the edge portion, from each other can be rendered clear. In this manner, it becomes possible to prevent the problems from occurring in that the graininess becomes spatially non-dense.

Further, as described above, the calculation of the middle frequency components and/or the high frequency components, which are subjected to the emphasis and restriction processing, and the calculation of the rating value may be carried out respectively in accordance with different colors, which are among red, green, and blue three colors. In such cases, the middle frequency components and/or the high frequency components and the rating value are calculated from statistically independent information, and therefore the variations of the distributions of them become different from each other. Accordingly, the distribution of the middle frequency components and/or the high frequency components and the distribution of the rating value are not affected by each other, and the emphasis and restriction processing of the middle frequency components and/or the high frequency components can be carried out without being affected by the distribution of the rating value. As a result, high-level graininess portions of the middle frequency components and/or the high frequency components can be prevented from being emphasized, and it becomes possible to prevent the problems from occurring in that the graininess becomes spatially non-dense.

Furthermore, the degrees of the emphasis and the restriction in the emphasis and restriction processing may be calculated in accordance with the image reproducing conditions each time the processing is carried out. However, in such cases, the algorithm for calculating the degrees of the emphasis and the restriction cannot be kept simple, and a device for the calculation cannot be kept simple. Therefore, a plurality of the emphasis and restriction processing conditions should preferably be prepared previously in accordance with the image reproducing conditions, and predetermined emphasis and restriction processing conditions should preferably be selected from the plurality of the emphasis and restriction processing conditions in accordance with the image reproducing conditions in the reproduction of the visible image from the processed image signal. In such cases, the image processing apparatus can be kept simple, and the time required to carry out the processing can be kept short.

As described above in detail, with the image processing method and apparatus in accordance with the present invention, the image signal is separated into the low, middle, and high frequency components. The middle frequency components, which contain the roughness due to the film graininess, are restricted. The high frequency components, which contain the information concerning the edge portion, the texture portion, or the like, of the image, are emphasized. Therefore, in the visible image reproduced from the processed image signal, the roughness is restricted, and the sharpness is emphasized. Accordingly, a visible reproduced image having good image quality can be obtained. Also, with the image processing method and apparatus in accordance with the present invention, wherein the processing is carried out only on the luminance components of the middle and high frequency components, the roughness of the luminance components due to the film graininess can be restricted, and therefore a visible reproduced image having better image quality can be obtained.

BRIEF DESCRIPTION OF THE DRAWINGS

FIGS. 10A, 10B, and 10C are graphs showing correlations, FIGS. 11A and 11B are graphs showing correlations at a flat portion and an edge portion of an image, FIGS. 12A and 12B are graphs showing a correlation, which takes a negative value, FIGS. 14A and 11B are graphs showing how a gain is set with respect to a correlation value, FIG. 21 is a graph showing how a distribution of correlation values with respect to a flat portion in an image and a distribution of correlation values with respect to an edge portion in the image overlap one upon the other, FIG. 23 is a graph showing how correlation values with respect to a flat portion and an edge portion in an image, which correlation values have been obtained from filter processing with a median filter, are distributed.

DESCRIPTION OF THE PREFERRED EMBODIMENTS

The present invention will hereinbelow be described in further detail with reference to the accompanying drawings.

Figure 1:
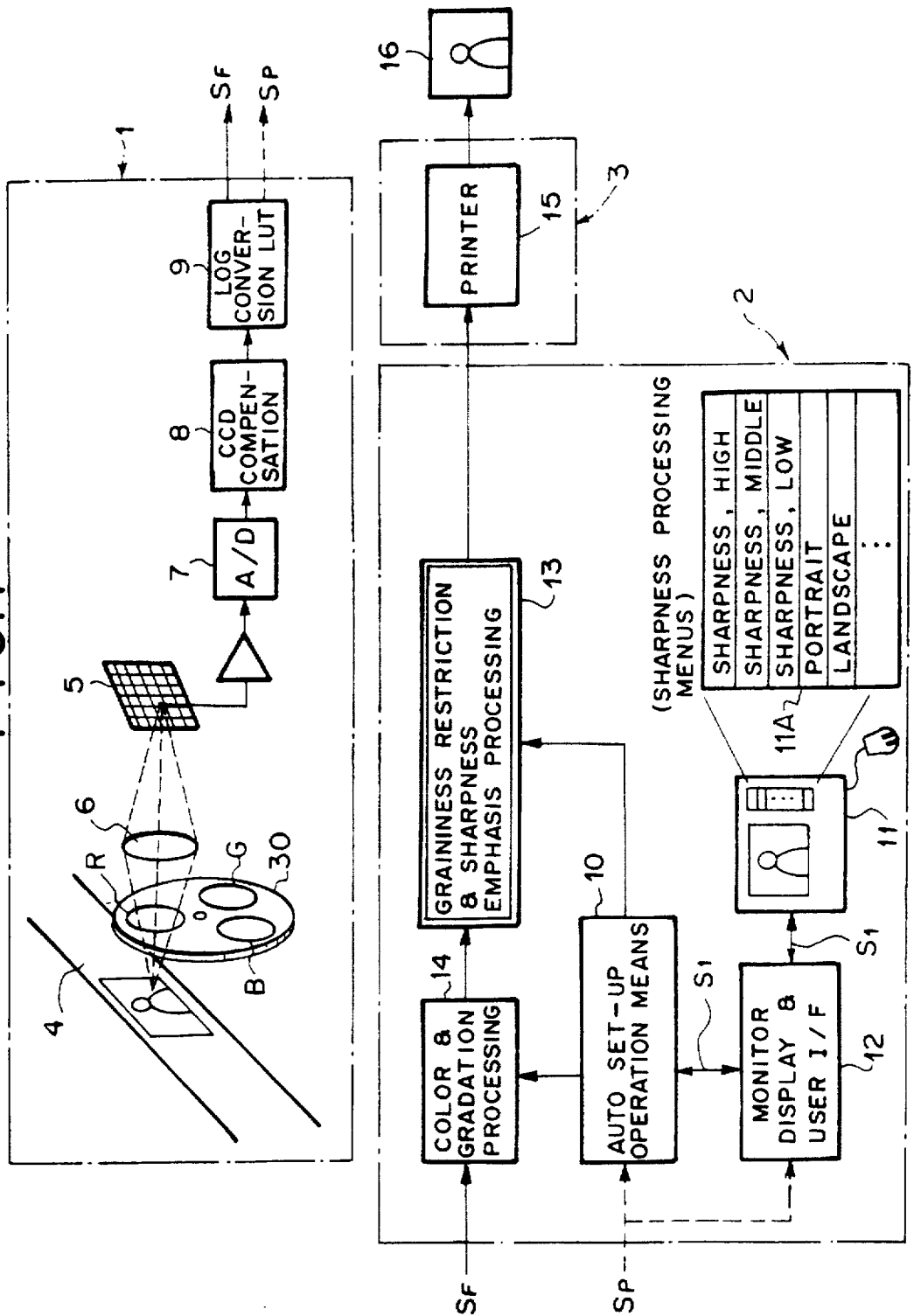
FIG. 1 is a block diagram showing an image read-out and reproducing system, wherein the image processing apparatus in accordance with the present invention is employed.

FIG. 1 is a block diagram showing an image read-out and reproducing system, wherein an image is read out from a color photograph, and a visible image is reproduced on a recording material, and wherein the image processing apparatus in accordance with the present invention is employed. As illustrated in FIG. 1, the image read-out and reproducing system, wherein the image processing apparatus in accordance with the present invention is employed, includes a read-out section 1 for reading out the image from the color photograph, and an image processing section 2 for carrying out the image processing on the image signal, which represents the image on the color photograph and is obtained from the read-out section 1. The image read-out and reproducing system also comprises a reproducing section 3 for reproducing the visible image on the recording material from the image signal, which has been obtained from the image processing carried out by the image processing section 2.

The read-out section 1 is provided with a CCD array 5, which photoelectrically detects R, G, and B color image signals from a color image 4 having been recorded on negative film, reversal film, or the like. The read-out section 1 is also provided with an image forming lens 6 for forming an image of light, which comes from the color image 4, on the CCD array 5. In this example, the CCD array 5 is constituted of 2,760×1,840 picture elements. The color image 4 is scanned, while a filter disk 30, which is provided with a red (R), green (G), and blue (B) three color separation filter, is being rotated. In this manner, the image signals representing the full-color image are obtained in an area sequential mode. The read-out section 1 is further provided with an analog-to-digital converter 7 for converting the image signals, which represent the color image and have been detected by the CCD array 5, into digital image signals, and a CCD compensation unit 8 for carrying out compensation for the CCD array 5. The read-out section 1 is still further provided with a logarithmic conversion unit 9 having a look-up table for logarithmic conversion of the image signals, which represent the color image and have been corrected by the CCD compensation unit 8. With the read-out unit 1, a pre-scanning operation is carried out before a fine scanning operation for obtaining the R, G, and B three color image signals is carried out. In the pre-scanning operation, the color image 4 is scanned at coarse scanning intervals and is thus approximately read out photoelectrically. Pre-scanning image signals $S_P$ are obtained from the pre-scanning operation. Thereafter, the fine scanning operation is carried out by scanning the color image 4 at fine scanning intervals, and fine scanning image signals $S_F$ are thereby obtained.

The image processing section 2 is provided with an automatic set-up operation unit 10 for setting parameters, which are to be used in gradation processing, or the like, during the fine scanning operation, in accordance with the pre-scanning image signals $S_P$. The image processing section 2 is also provided with a color and gradation processing unit 14 for carrying out color and gradation processing on the fine scanning image signals $S_F$ in accordance with the parameters, which have been set by the automatic set-up operation unit 10. The image processing unit 2 is further provided with a monitor display and user interface 12 for connecting the automatic set-up operation means 10 and a CRT display device 11, which reproduces a visible image from the pre-scanning image signals $S_P$, with each other. The image processing section 2 is still further provided with a processing means 13, which is the feature of the present invention and which carries out graininess restriction processing and sharpness emphasis processing on the color image signals.

The reproducing section 3 is provided with a printer 15 for reproducing a color image on a recording material 16 from the color image signals.

How the respective components operate interrlate will be described hereinbelow.

Firstly, with the read-out section 1, the pre-scanning operation is carried out, in which the color image 4 having been recorded on negative film, reversal film, or the like, is scanned at coarse scanning intervals and is thus read out approximately. The three-color pre-scanning image signals $S_P$, which have been obtained from the pre-scanning operation, are converted by the analog-to-digital converter 7 into digital image signals. The digital pre-scanning image signals $S_P$ are corrected by the CCD compensation unit 8, logarithmically amplified by the logarithmic conversion unit 9, and fed into the automatic set-up operation unit 10 and the monitor display and user interface (hereinbelow referred to as the interface) 12 of the image processing section 2. The pre-scanning image signals $S_P$ are fed from the interface 12 into the CRT display device 11, and a visible image is reproduced on the CRT display device 11 from the pre-scanning image signals $S_P$. Besides the visible image, sharpness processing menus 11A are displayed on the CRT display device 11. A desired menu is selected by the user from the sharpness processing menus 11A, and a signal $S_1$ representing the results of the selection is fed from the CRT display device 11 into the interface 12 and then into the automatic set-up operation unit 10. In the automatic set-up operation unit 10, the parameters for the color and gradation processing, which is carried out by the color and gradation processing unit 14, are set in accordance with the pre-scanning image signals $S_P$ and the signal $S_1$. Information representing some of the parameters is fed into the processing unit 13, which will be described later in detail.

How the parameters are set will be described hereinbelow. In the automatic set-up operation unit 10, the density range and the print size of the color image 4 are calculated from the received pre-scanning image signals $S_P$. Also, a gain M, by which the middle frequency components are to be multiplied in the emphasis and restriction processing carried out by the processing means 13, and a gain H, by which the high frequency components are to be multiplied in the emphasis and restriction processing, are calculated in accordance with the signal $S_1$, which has been received from the CRT display device 11 via the interface 12. Further, in the automatic set-up operation means 10, the parameters for the color and gradation processing, which is carried out by the color and gradation processing unit 14, are calculated. The information representing the results of the calculations is fed into the processing unit 13 and the color and gradation processing unit 14.

Thereafter, with the read-out section 1, the fine scanning operation is carried out by scanning the color image 4 at fine scanning intervals, and the three-color fine scanning image signals $S_F$ are thereby obtained as the color image signals. The fine scanning image signals $S_F$ are converted by the analog-to-digital converter 7 into digital image signals. The digital fine scanning image signals $S_F$ are corrected by the CCD compensation unit 8, logarithmically amplified by the logarithmic conversion unit 9, and fed into the color and gradation processing unit 14. In the color and gradation processing unit 14, the color and gradation processing is carried out on the fine scanning image signals $S_F$. The fine scanning image signals $S_F$ having been obtained from the color and gradation processing are fed into the processing unit 13.

How the processing is carried out by the processing unit 13 will be described hereinbelow.

Figure 2:
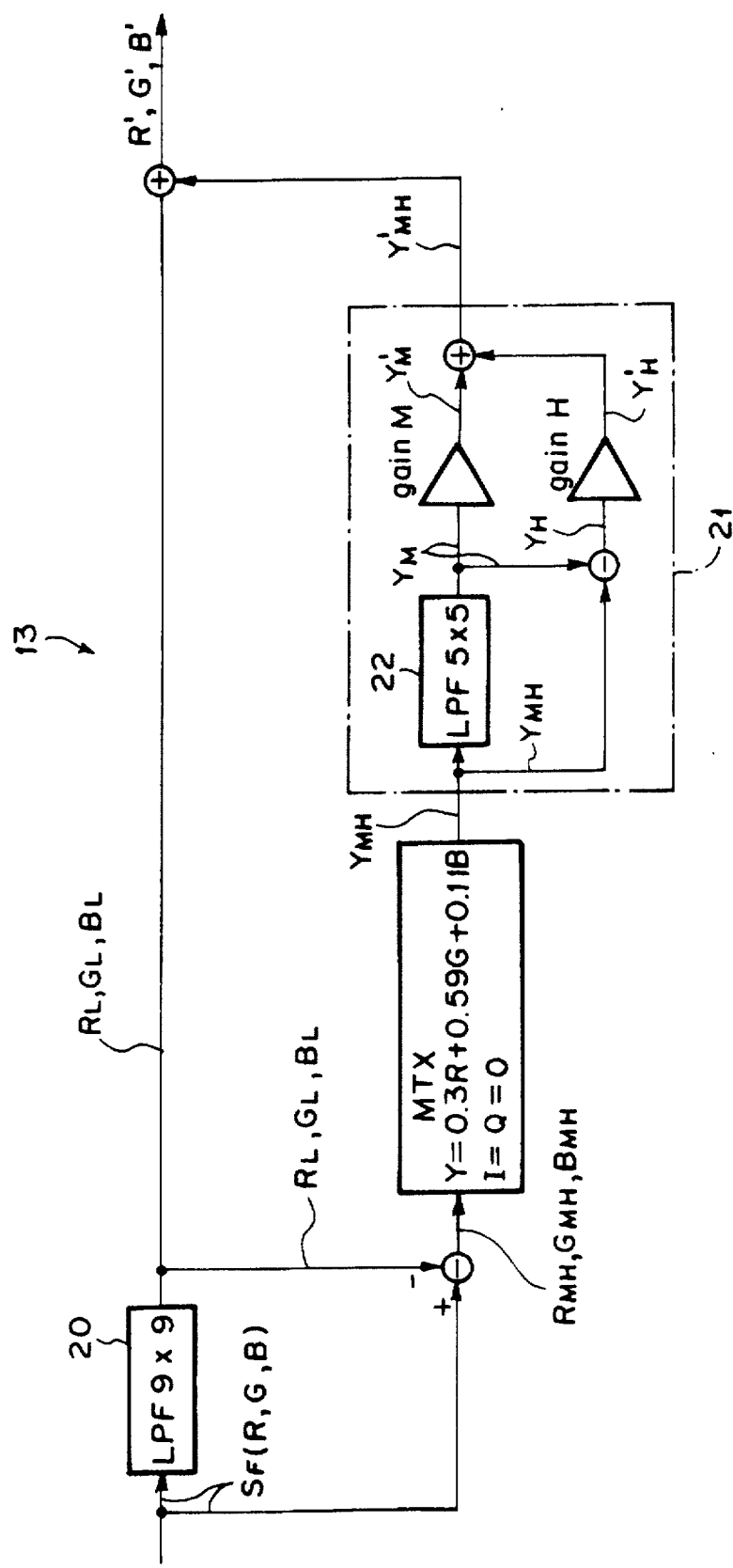
FIG. 2 is a block diagram showing a first embodiment of the image processing apparatus in accordance with the present invention.

FIG. 2 is a block diagram showing a first embodiment of the image processing apparatus in accordance with the present invention, the diagram serving as an aid in explaining how the processing is carried out in the processing unit 13. As illustrated in FIG. 2, filter processing is carried out by a 9×9 low-pass filter 20, which is formed by connecting two 5×5 low-pass filters, each having the constitution shown below, in series, on the fine scanning image signals $S_F$(R, G, B). In this manner, low frequency components $R_L$, $G_L$, and $B_L$ of the fine scanning image signals $S_F$(R, G, B) are extracted.

$$\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}$$

Also, the low frequency components $R_L$, $G_L$, and $B_L$ are subtracted from the fine scanning image signals $S_F$(R, G, B). In this manner, middle and high frequency components $R_{MH}$, $G_{MH}$, and $B_{MH}$ are extracted from the fine scanning image signals $S_F$(R, G, B). The low frequency components $R_L$, $G_L$, and $B_L$, which have been extracted, do not contain the roughness due to edge and fine texture portions of the color image and due to the film graininess. The middle frequency components $R_M$, $G_M$, and $B_M$ contain the roughness due to the film graininess. The high frequency components $R_H$, $G_H$, and $B_H$ contain the information concerning the edge and fine texture portions of the color image.

Figure 3:
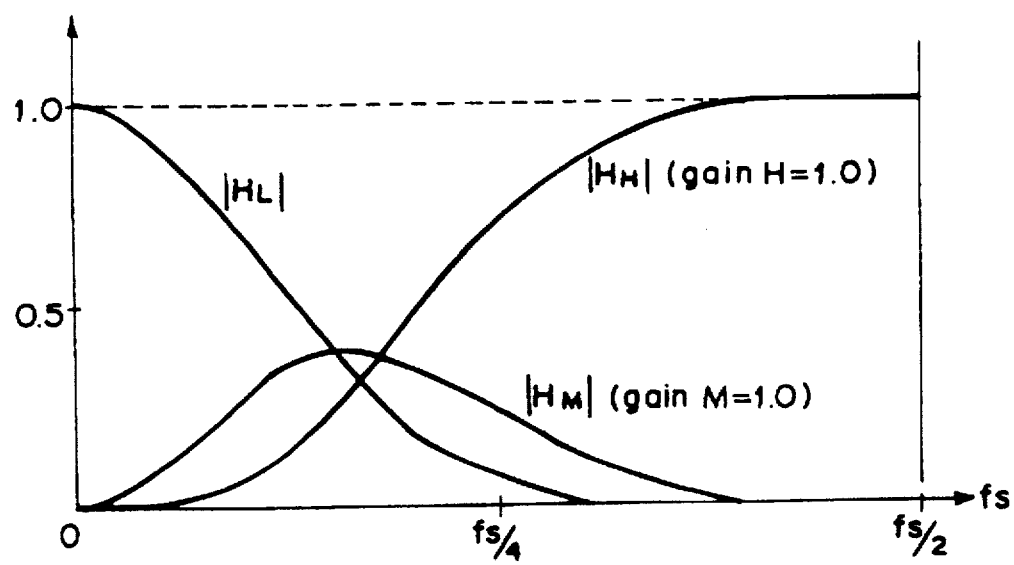
FIG. 3 is a graph showing how low, middle, and high frequency components are distributed.

The term "low frequency components, middle frequency components, and high frequency components of fine scanning image signals $S_F$," as used herein means the frequency components that are distributed in the patterns shown in FIG. 3 in cases where the gain M, by which the middle frequency components are to be multiplied, and the gain H, by which the high frequency components are to be multiplied, are equal to 1.0. The middle frequency components $R_M$, $G_M$, and $B_M$ are distributed in a pattern $H_M$ such that they may have a peak in the vicinity of ⅓ of the Nyquist frequency $f_s/2$ of the output in the reproduction of a visible image from the signals having been processed. The low frequency components $R_L$, $G_L$, and $B_L$ are distributed in a pattern $H_L$ such that they may have a peak at a frequency of zero. The high frequency components $R_H$, $G_H$, and $B_H$ are distributed in a pattern $H_H$ such that they may have a peak at the Nyquist frequency $f_s/2$ of the output. The term "Nyquist frequency" as used in this embodiment means the Nyquist frequency which is determined when the recording on the recording material 16 is carried out at 300 dpi. In FIG. 3, at each frequency, the sum of the low, middle, and high frequency components becomes equal to 1.

Thereafter, the luminance components are extracted from the middle and high frequency components $R_{MH}$, $G_{MH}$, and $B_{MH}$, which have been separated from the fine scanning image signals $S_F$(R, G, B). The luminance components can be extracted by converting the middle and high frequency components $P_{MH}$, $G_{MH}$, and $B_{MH}$ of the fine scanning image signals $S_F$(R, G, B) to the YIQ base and thereby obtaining luminance components $Y_{MH}$. The conversion to the YIQ base is carried out with the formula shown below.

$$\begin{pmatrix} I \\ Q \\ Y \end{pmatrix} = \begin{pmatrix} 0.60 & -0.28 & -0.32 \\ 0.21 & -0.52 & 0.31 \\ 0.30 & 0.59 & 0.11 \end{pmatrix} \begin{pmatrix} R \\ G \\ B \end{pmatrix}$$

Components $I_{MH}$ and $Q_{MH}$, which are the chrominance components obtained from the conversion to the YIQ base, contain the roughness of color due to the film graininess. Therefore, in this embodiment, the components $I_{MH}$ and $Q_{MH}$ are set to be zero such that the roughness of color due to the film graininess can be restricted. It has been known experimentally that the components $I_{MH}$ and $Q_{MH}$, which are the chrominance components, have little level of component in the cases of images of ordinary objects. Therefore, the components $I_{MH}$ and $Q_{MH}$ can be regarded as being the components constituting the roughness of color due to the film graininess and are set to be zero. In this manner, the roughness of color due to the film graininess can be restricted, and a reproduced image having good image quality can be obtained.

Thereafter, in a gain processing means 21, filter processing is carried out by a 5×5 low-pass filter 22, which is of the same type as the 5×5 low-pass filter described above, on the luminance components $Y_{MH}$. Middle frequency components $Y_M$ of the luminance components $Y_{MH}$ are thereby obtained.

Also, the middle frequency components $Y_M$ are subtracted from the luminance components $Y_{MH}$, and high frequency components $Y_H$ of the luminance components $Y_{MH}$ are thereby obtained.

The middle frequency components $Y_M$ and the high frequency components $Y_H$ are then multiplied respectively by the gain M and the gain H, which have been calculated by the automatic set-up operation unit 10. Processed components $Y_M'$ and $Y_H'$ are thereby obtained. Further, the processed components $Y_M'$ and $Y_H'$ are combined with each other, and processed luminance components $Y_{MH}'$ are thereby obtained. The calculation is carried out with Formula (1).

$$Y_{MH}' = \text{gain } M \times Y_M + \text{gain } H \times Y_H \qquad (1)$$

$(Y_M' = \text{gain } M \times Y_M, Y_H' = \text{gain } H \times Y_H)$

In the automatic set-up operation unit 10, the gain M and the gain H are set such that gain M<gain H. Specifically, the roughness of the luminance components due to the film graininess is contained primarily in the middle frequency components. Therefore, the gain M of the middle frequency components $Y_M$ is set to be comparatively small, and the rough feeling is thereby restricted. Also, the image sharpness depends upon the high frequency components of the luminance components. Therefore, the gain H of the high frequency components $Y_H$ of the luminance components is set to be comparatively large, and the sharpness of the processed image is thereby emphasized.

For example, in cases where the color image 4 is an under-exposed negative film, the roughness due to the film graininess becomes perceptible. Also, in cases where the gradation is raised in order to improve the gradation characteristics, an image is obtained in which the graininess is very bad. Therefore, in such cases, by the automatic set-up operation unit 10, the gain M is set to be very small. In this manner, the graininess can be restricted markedly. The setting of appropriate values of the gain M and the gain H also depends upon the print size. Further, as described above, in cases where a desired menu is selected by the user from a plurality of sharpness emphasis processing menus, values of the gain M and the gain H, which are appropriate for the respective menus, should preferably be stored as a table such that the appropriate values of the gain M and the gain H can be selected in accordance with the selection of the menu. In such cases, the processing can be carried out in accordance with the type of the image or the choice of the user.

The processed luminance components $Y_{MH}'$, which have been obtained in the manner described above, are combined with the low frequency components $R_L$, $G_L$, and $B_L$ of the fine scanning image signals $S_F(R, G, B)$, and processed image signals R', G', and B' are thereby obtained. Since the values of the components $I_{MH}$ and $Q_{MH}$ were set to be zero, when the processed luminance components $Y_{MH}'$ are inversely converted so as to correspond to the R, G, and B signals, all of the R, G, and B signals take the same values as the values of the processed luminance components $Y_{MH}'$. Therefore, even if the processed luminance components $Y_{MH}'$ are not converted inversely, the results of the combining of the processed luminance components $Y_{MH}'$ and the low frequency components $R_L$, $G_L$, and $B_L$ with each other will become identical with the results of the combining, which are obtained when the processed luminance components $Y_{MH}'$ are converted inversely. Accordingly, in this embodiment, such that the processing may be kept simple, the processed luminance components $Y_{MH}'$ are combined with the low frequency components $R_L$, $G_L$, and $B_L$ without being converted inversely.

Thereafter, the processed image signals R', G', and B' are fed into the reproducing section 3. In the reproducing section 3, the printer 15 reproduces a visible image on the recording material 16 from the processed image signals R', G', and B'.

As described above, the I and Q chrominance components of the middle and high frequency components $R_{MH}$, $G_{MH}$, and $B_{MH}$, which contain the roughness due to the film graininess, are set to be zero. Also, of the luminance components $Y_{MH}$ of the middle and high frequency components $R_{MH}$, $G_{MH}$, and $B_{MH}$, the middle frequency components $Y_M$ are multiplied by the gain M which takes a small value, and the high frequency components $Y_H$ are multiplied by the gain H which takes a large value. Therefore, a reproduced image is thus obtained, in which the sharpness has been emphasized and the roughness due to the film graininess has been restricted.

A second embodiment of the image processing apparatus in accordance with the present invention will be described hereinbelow.

Figure 4:
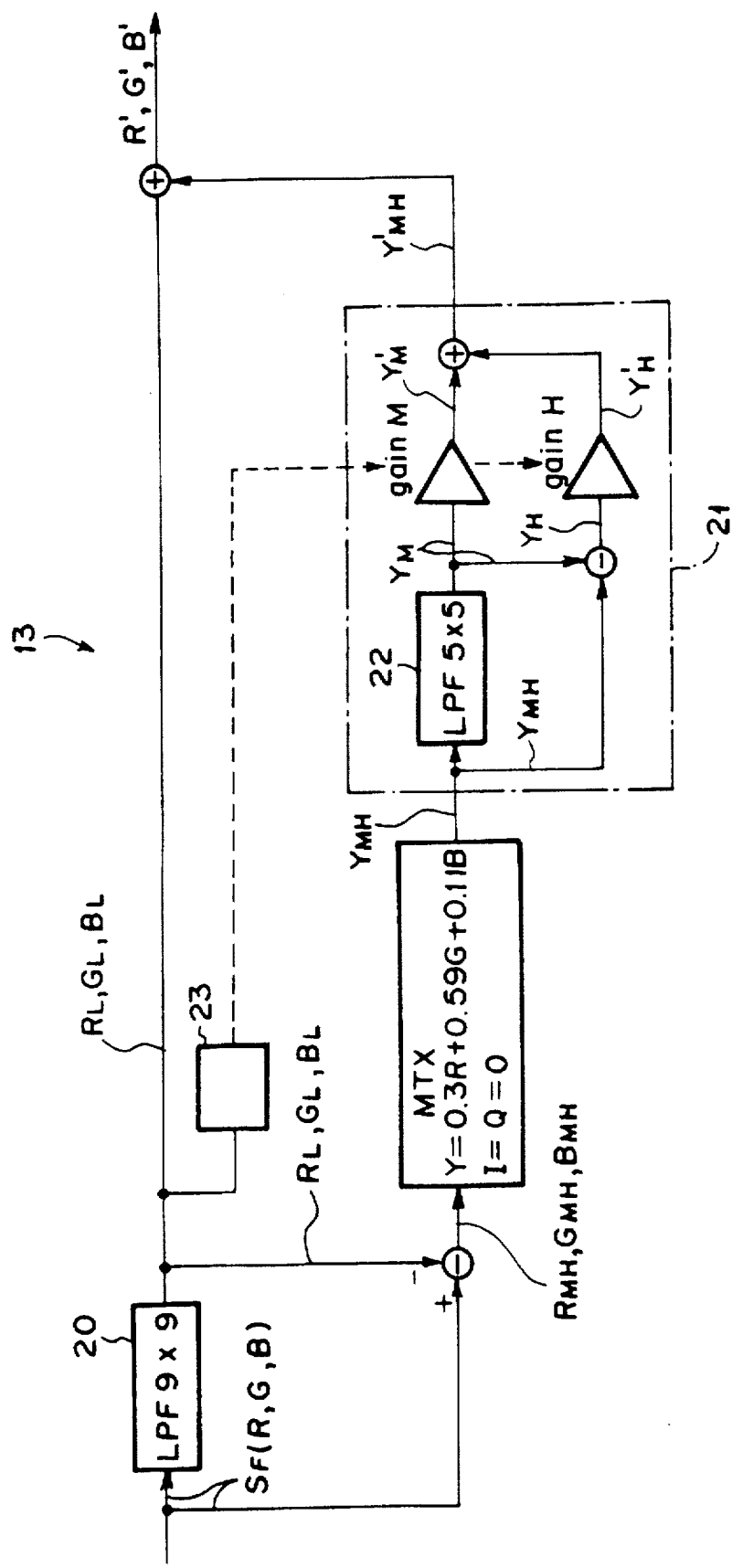
FIG. 4 is a block diagram showing a second embodiment of the image processing apparatus in accordance with the present invention.
Figure 5:
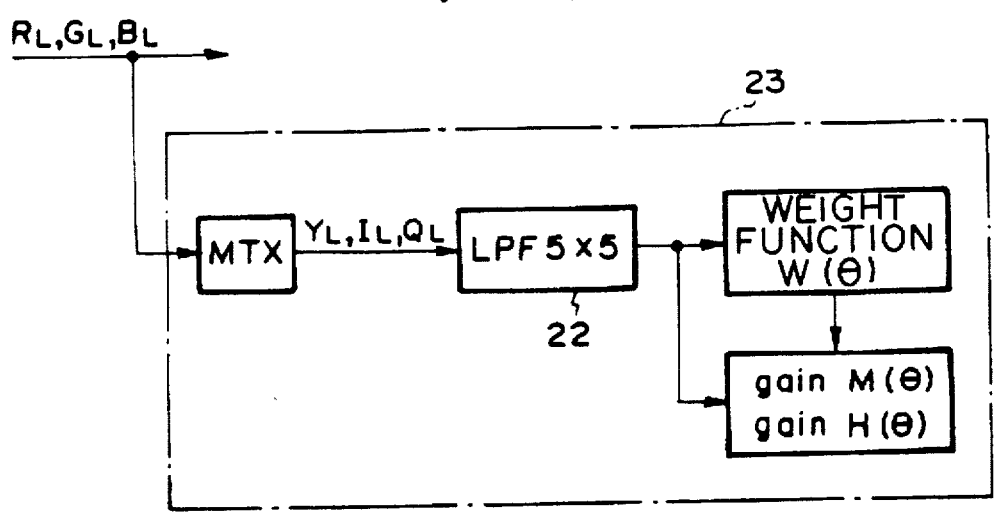
FIG. 5 is a graph showing a specific color extracting and gain calculating means.

FIG. 4 is a block diagram showing the second embodiment of the image processing apparatus in accordance with the present invention, the diagram serving as an aid in explaining how the processing is carried out in a processing unit 13. As illustrated in FIG. 4, the processing unit 13 in the second embodiment of the image processing apparatus in accordance with the present invention is constituted basically in the same manner as that of the processing unit 13 shown in FIG. 2, except that a specific color extracting and gain calculating unit 23 is further provided. In the specific color extracting and gain calculating unit 23, a specific color region is extracted from the color image 4, and the values of the gain M and the gain H, by which the luminance components $Y_{MH}$ are multiplied, are changed only for the specific color portion. The specific color extracting and gain calculating unit 23 carries out the processing shown in FIG. 5. Specifically, the processing for conversion to the YIQ base is carried out on the low frequency components $R_L$, $G_L$, and $B_L$ of the fine scanning image signals $S_F(R, G, B)$, and components $Y_L$, components $I_L$, and components $Q_L$ are thereby obtained. Filter processing is then carried out by a 5×5 low-pass filter 22, which is of the same type as the low-pass filter 22 described above, on the components $Y_L$, the components $I_L$, and the components $Q_L$. In this manner, low frequency components of the components $I_L$, and the components $Q_L$ are obtained.

Figure 6:
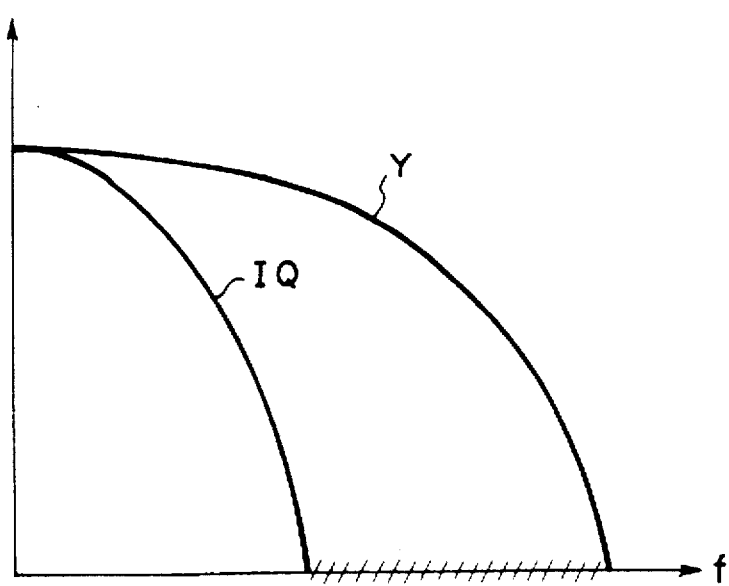
FIG. 6 is a graph showing frequency characteristics of Y components, I components, and Q components.

The filter processing of the components $Y_L$, the components $I_L$, and the components $Q_L$ of the low frequency components $R_L$, $G_L$, and $B_L$ with the low-pass filter 22 is carried out for the reasons described below. Specifically, as illustrated in FIG. 6, frequency characteristics of the components $Y_L$, the components $I_L$, and the components $Q_L$ of the low frequency components $R_L$, $G_L$, and $B_L$ are such that the components $I_L$ and the components $Q_L$ may be distributed primarily in a low frequency band, and the components $Y_L$ may be distributed up to a high frequency band. The high frequency band of the components $Y_L$ (hatched in FIG. 6) contains comparatively much noise components. Therefore, such that the noise components may be removed and the accuracy, with which the specific color region is extracted, can be kept high, the filter processing is carried out with the low-pass filter 22, and noise is thereby removed.

Figure 7:
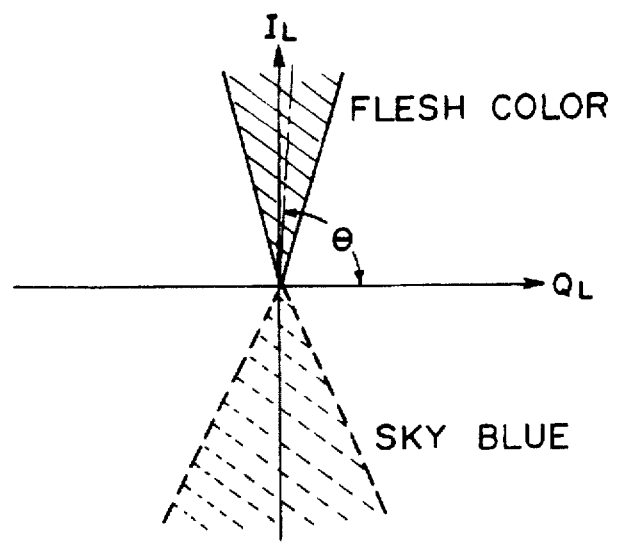
FIG. 7 is a graph showing a QI plane.

Of the components $Y_L$, $I_L$, and $Q_L$ having thus been extracted, the components $I_L$ and the components $Q_L$ are utilized for the detection of the specific color region. In this embodiment, a flesh-color region is detected. Specifically, as illustrated in FIG. 7, on a QI plane, the components $Q_L$ and the components $I_L$, which are the chrominance components, are plotted respectively on the horizontal axis and the vertical axis. Picture elements, which have signal values falling within a predetermined range (hatched with the solid lines in FIG. 7) having its center at the color that constitutes a hue angle of θ in the QI plane, and which have signal values larger than a predetermined threshold value, are detected as the ones constituting the flesh-color region. The processing with the threshold value is carried out for the reasons described below. Specifically, in cases where the flesh-color region is detected, the region detected is primarily a pattern of a face of a human body. The signal values corresponding to such a region become markedly larger than those corresponding to the other regions. Therefore, the processing with the threshold value is carried out such that the other regions of colors resembling the flesh color can be prevented from being extracted and such that the face region can be detected easily.

Figure 8A:
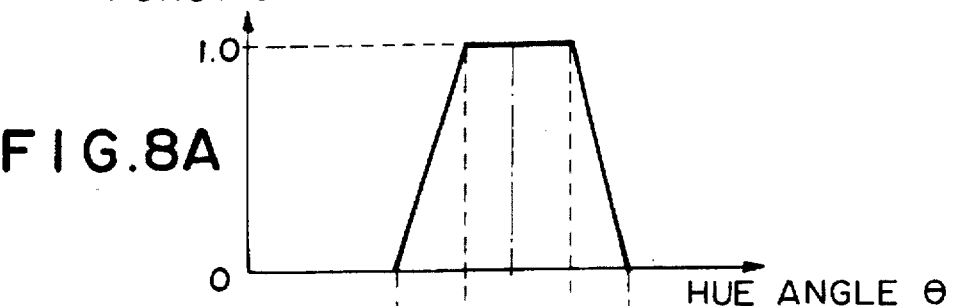
FIGS. 8A and 8B are graphs showing weights of gains M and H.
Figure 8B:
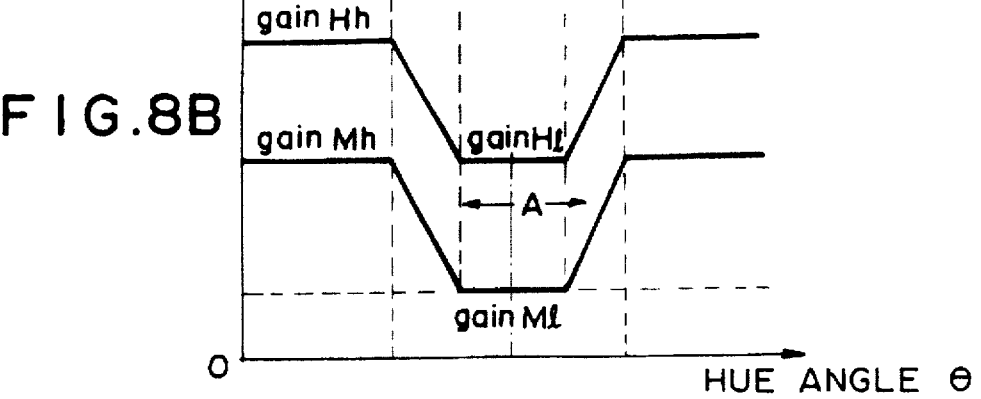

After the flesh-color region has thus been detected, the values of the gain M and the gain H with respect to the flesh-color region are changed. Specifically, as illustrated in FIG. 8A, a weight function W(θ) for emphasizing the region of the hue angles, which correspond to the region hatched with the solid lines in FIG. 7, is determined. Also, as illustrated in FIG. 8B, the gain M and the gain H are changed in accordance with the weight function W(θ). The gain M(θ) and the gain H(θ) with respect to the hue angle q are calculated with Formula (2).

Gain $M(\theta)$=gain $Mh-W(\theta)\cdot$(gain $Mh-$gain $Ml$)

Gain $H(\theta)$=gain $Hh-W(\theta)\cdot$(gain $Hh-$gain $Hl$)  (2)

wherein the gain Mh and the gain Hh respectively represent the maximum values of the gain M and the gain H, and the gain Ml and the gain Hl respectively represent the minimum values of the gain M and the gain H.

With Formula (2), as illustrated in FIG. 8B, the values of the gain M and the gain H corresponding to the flesh-color region are set to be smaller than the values of the gain M and the gain H for the other color regions.

After the gain M(θ) and the gain H(θ) have been calculated in the manner described above, the middle frequency components $Y_M$ and the high frequency components $Y_H$ of the luminance components $Y_{MH}$ are multiplied by the gains in accordance with the gain M(θ) and the gain H(θ). Processed middle frequency components $Y_M'$ and processed high frequency components $Y_H'$ are thereby obtained. The processed components $Y_M'$ and $Y_H'$ are then combined with each other, and processed luminance components $Y_{MH}'$ are thereby obtained. Thereafter, the processed luminance components $Y_{MH}'$ are combined with the low frequency components $R_L$, $G_L$, and $B_L$ of the fine scanning image signals $S_F$(R, G, B), and processed image signals R', G', and B' are thereby obtained.

In the manner described above, the specific color region is detected from the image, and the values of the gains with respect to the specific color region are changed. As a result, the roughness in the flesh-color region, in which the roughness due to the film graininess is apt to become perceptible, can be restricted. Therefore, a reproduced image having better image quality can be obtained.

In the second embodiment described above, the flesh-color region is detected. In color images, the roughness becomes comparatively perceptible also in a sky blue region. Therefore, the values of the gain M and the gain H may be changed with respect to the sky blue region. In the QI plane, the sky blue region corresponds to the region, which is hatched with the broken lines in FIG. 7.

A third embodiment of the image processing apparatus in accordance with the present invention will be described hereinbelow.

Figure 9:
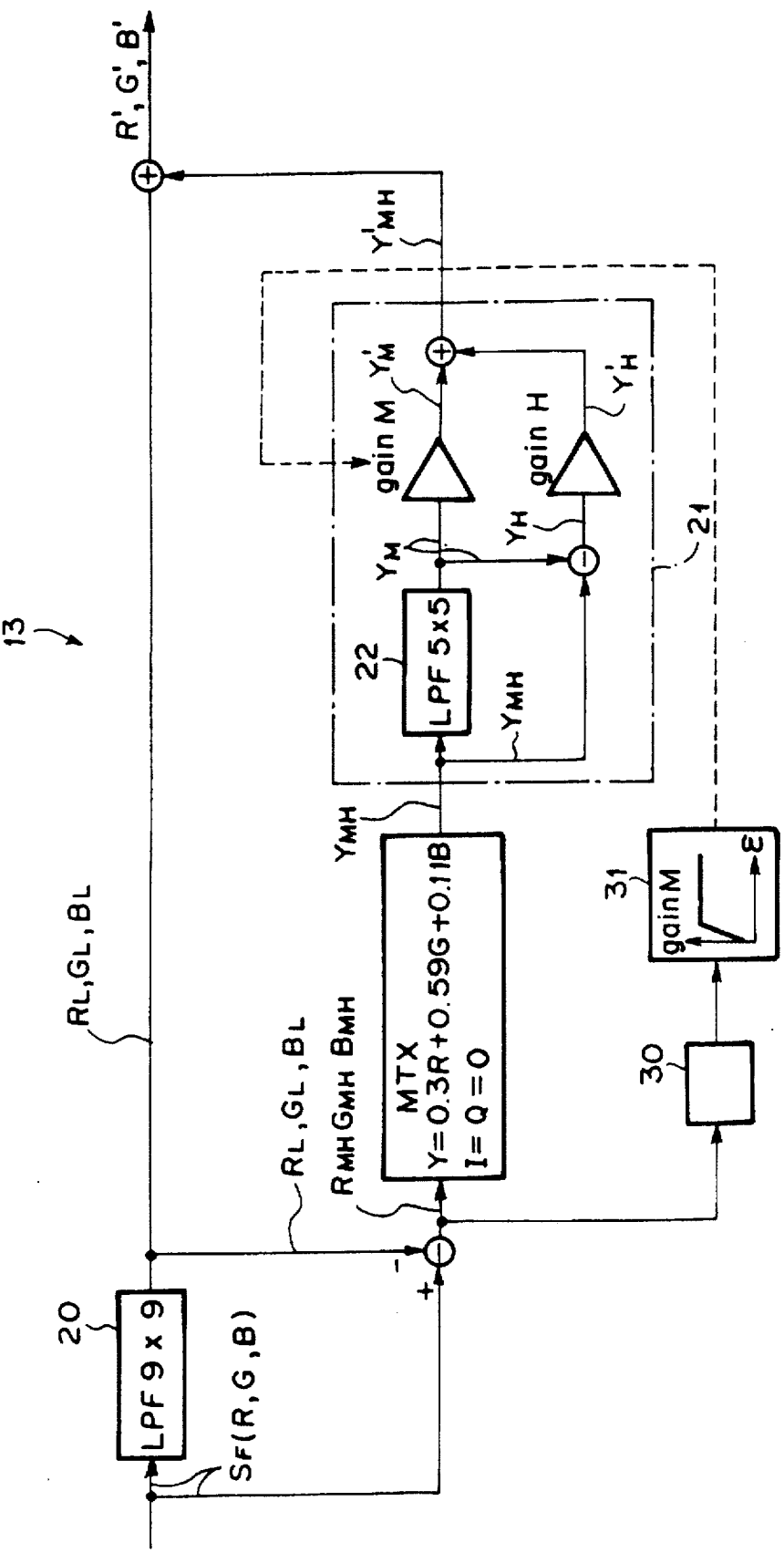
FIG. 9 is a block diagram showing a third embodiment of the image processing apparatus in accordance with the present invention.

FIG. 9 is a block diagram showing the third embodiment of the image processing apparatus in accordance with the present invention, the diagram serving as an aid in explaining how the processing is carried out in a processing unit 13. As illustrated in FIG. 9, the processing unit 13 in the third embodiment of the image processing apparatus in accordance with the present invention is constituted basically in the same manner as that of the processing unit 13 shown in FIG. 2, except that a correlation value calculating unit 30 is further provided. In the correlation value calculating unit 30, a correlation value ε among the red, green, and blue three colors is calculated from the middle and high frequency components $R_{MH}$, $G_{MH}$, and $B_{MH}$ of the fine scanning image signals $S_F$(R, G, B). The value of the gain M is determined in accordance with the calculated correlation value ε with reference to a look-up table 31. How the correlation value ε is calculated will be described hereinbelow.

In general, the cross correlation between stochastic variables X and Y is represented by the formula shown below.

$E\{(X-X_m)\cdot(Y-Y_m)\}$ wherein $X_m$ and $Y_m$ represent the mean values. As illustrated in FIGS. 10A, 10B, and 10C, cross correlations can be classified into three types. Specifically, as illustrated in FIG. 10A, in cases where $E\{(X-X_m)\cdot(Y-Y_m)\}=0$ there is no correlation between X and Y. As illustrated in FIG. 10B, in cases where $E\{(X-X_m)\cdot(Y-Y_m)\}=>0$ and the absolute value is large, the correlation between X and Y is large. Also, as illustrated in FIG. 10C, in cases where $E\{(X-X_m)\cdot(Y-Y_m)\}=<0$ and the absolute value is large, the correlation between X and Y is large.

On the assumption that the aforesaid relationship obtains with respect to the correlation values, the correlation values $\epsilon_{RG}$, $\epsilon_{GB}$, and $\epsilon_{BR}$ among the colors are calculated from the middle and high frequency components $R_{MH}$, $G_{MH}$, and $B_{MH}$. The calculation is carried out with Formula (3).

$$\epsilon_{RG} = \frac{1}{(2m+1)^2} \sum_{i=-m}^{m} \sum_{j=-m}^{m} R_{MHi,j} G_{MHi,j}$$

$$\epsilon_{GB} = \frac{1}{(2m+1)^2} \sum_{i=-m}^{m} \sum_{j=-m}^{m} G_{MHi,j} B_{MHi,j}$$

$$\epsilon_{BR} = \frac{1}{(2m+1)^2} \sum_{i=-m}^{m} \sum_{j=-m}^{m} B_{MHi,j} R_{MHi,j}$$

(3)

wherein $\epsilon_{RG}$ represents the correlation value between the R and the G, $\epsilon_{GB}$ represents the correlation value between the G and the B, $\epsilon_{BR}$ represents the correlation value between the B and the R, and m represents the size of the mask for the calculation of the correlation value (by way of example, m=1, 2, 3, or 4).

The mean values of the middle and high frequency components $R_{MH}$, $G_{MH}$, and $B_{MH}$ are approximately equal to zero. Therefore, the operation for subtracting the mean values from the signal values can be omitted.

When the correlation values among the colors are calculated, the results described below are obtained. Specifically, as illustrated in FIGS. 11A and 11B, when the correlation value between the middle and high frequency components $R_{MH}$ and $G_{MH}$ is calculated, the correlation value is approximately equal to zero with respect to a flat portion 33, at which much noise due to the film graininess is contained and the respective components have random signal values. Also, in cases where the correlation value becomes negative as illustrated in FIG. 10C, the correlation between the signals is the one shown in FIGS. 12A and 12B and does not correspond to an edge portion of the image. Therefore, in this embodiment, in such cases, the correlation value is taken as being zero. Accordingly, in cases where each of the correlation values $\epsilon_{RG}$, $\epsilon_{GB}$, and $\epsilon_{BR}$ is smaller than a predetermined threshold value, the portion associated with the correlation value can be regarded as being the flat portion, at which much noise due to the graininess is contained. In cases where the correlation value is larger than the predetermined threshold value, the portion associated with the correlation value can be regarded as being the edge portion of the image.

Figure 13:
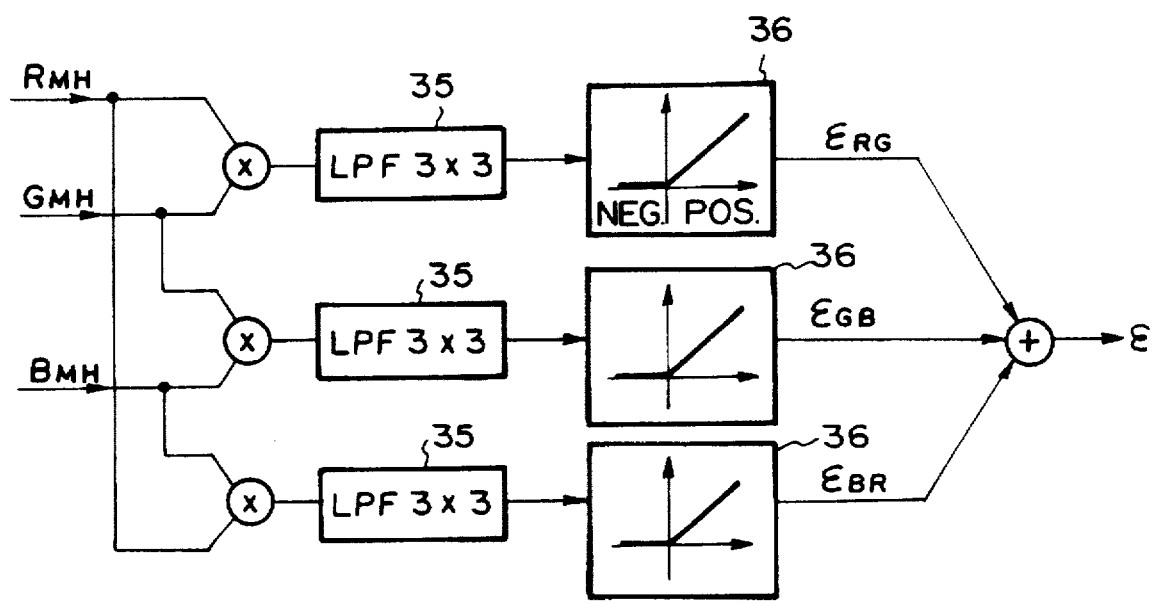
FIG. 13 is a block diagram showing how processing is carried out in a correlation value calculating means.

How the correlation values $\epsilon_{RG}$, $\epsilon_{GB}$, and $\epsilon_{BR}$ are calculated when m=1 in Formula (3) and how the gains are calculated will hereinbelow be described in detail. As illustrated in FIG. 131 firstly, the correlation values among the middle and high frequency components $R_{MH}$, $G_{MH}$, and $B_{MH}$ are calculated. In FIG. 13, tables 36, 36, 36 are referred to, and the correlation values are taken as being zero when the correlation values $\epsilon_{RG}$, $\epsilon_{GB}$, and $\epsilon_{BR}$ become negative. In cases where m=1 in Formula (3), the correlation values $\epsilon_{RG}$, $\epsilon_{GB}$, and $\epsilon_{BR}$ among the middle and high frequency components $R_{MH}$, $G_{MH}$, and $B_{MH}$ are calculated with Formula (4).

$$\epsilon_{RG} = \frac{1}{3\times 3} \sum_{i=-1}^{1} \sum_{j=-1}^{1} R_{MHi,j} G_{MHi,j} \quad (4)$$

if $\epsilon_{RG} < 0$ then $\epsilon_{RG} = 0$ $$\epsilon_{GB} = \frac{1}{3\times 3} \sum_{i=-1}^{1} \sum_{j=-1}^{1} G_{MHi,j} B_{MHi,j}$$

if $\epsilon_{GB} < 0$ then $\epsilon_{GB} = 0$ $$\epsilon_{BR} = \frac{1}{3\times 3} \sum_{i=-1}^{1} \sum_{j=-1}^{1} B_{MHi,j} R_{MHi,j}$$

if $\epsilon_{BR} < 0$ then $\epsilon_{BR} = 0$

The correlation values $\epsilon_{RG}$, $\epsilon_{GB}$, and $\epsilon_{BR}$ having been calculated with Formula (4) are then added to one another with Formula (5).

$$\epsilon = \epsilon_{RG} + \epsilon_{GB} + \epsilon_{BR} \quad (5)$$

Figure 14A:
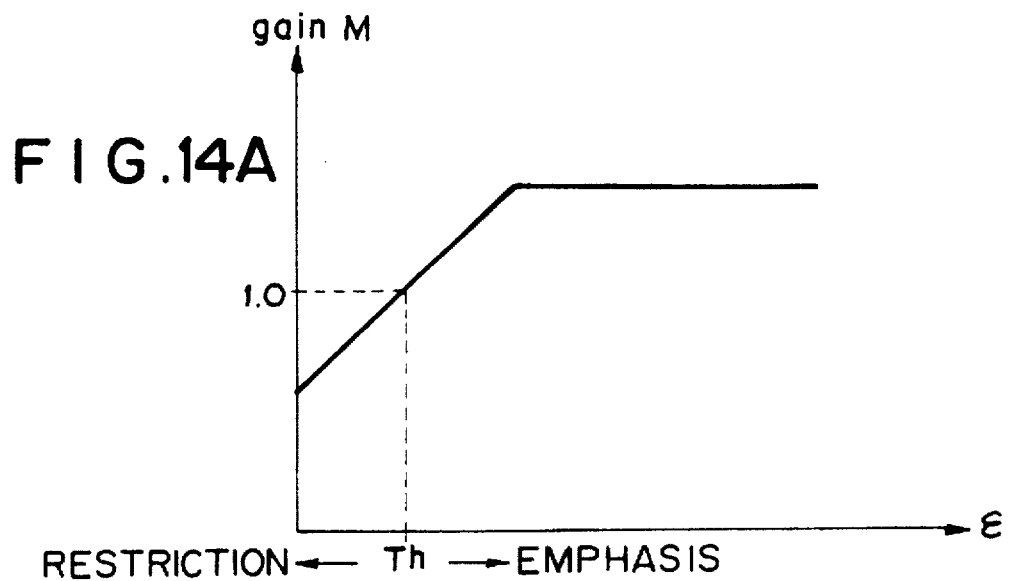
Figure 14B:
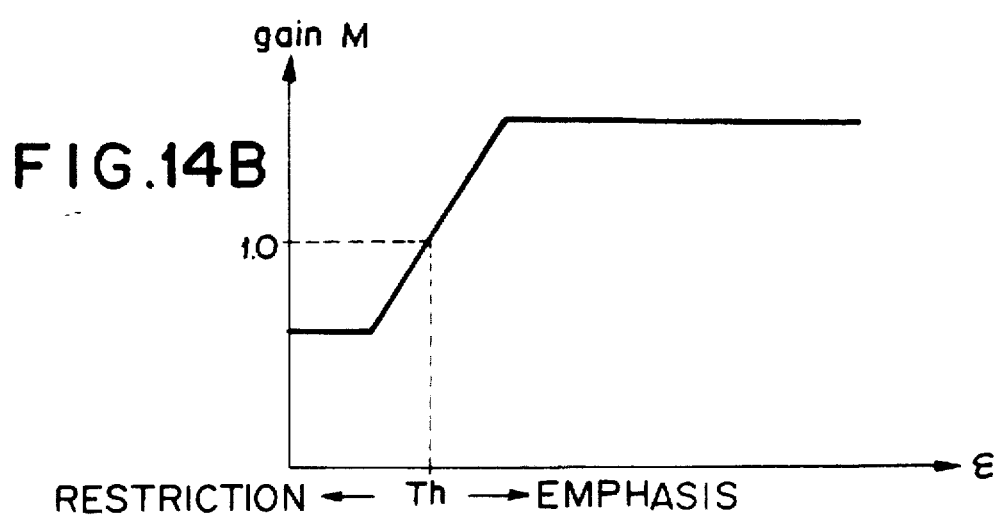

Thereafter, a look-up table shown in FIG. 14A or FIG. 14B is referred to, and the value of the gain M in accordance with the correlation value at each picture element is calculated from the value of $\epsilon$ having thus been obtained. Specifically, in cases where the correlation value $\epsilon$ is smaller than a predetermined threshold value Th, the value of the gain M is set to be small. In cases where the correlation value $\epsilon$ is larger than the predetermined threshold value Th, the value of the gain M is set to be large. The middle frequency components $Y_M$ of the luminance components $Y_{MH}$ of the middle and high frequency components $R_{MH}$, $G_{MH}$, and $B_{MH}$ are then multiplied by the gain M having thus been set. Processed middle frequency components $Y_{MH}'$ are thereby obtained. Also, the high frequency components $Y_H$ of the luminance components $Y_{MH}$ are multiplied by the gain H, and processed high frequency components $Y_H'$ are thereby obtained. The processed middle frequency components $Y_M'$, which have been multiplied by the gain M, and the processed high frequency components $Y_H'$, which have been multiplied by the gain H, are then combined with each other, and processed luminance components $Y_{MH}'$ are thereby obtained. Thereafter, the processed luminance components $Y_{MH}'$ are combined with the low frequency components $R_L$, $G_L$, and $B_L$ of the fine scanning image signals $S_F(R, G, B)$, and processed image signals R', G', and B' are thereby obtained.

In the manner described above, the correlation value $\epsilon$ among the R, G, and B three colors is calculated, and the value of the gain M is changed in accordance with the correlation value $\epsilon$. With respect to the region, in which noise due to the film graininess is apt to become perceptible, the correlation value $\epsilon$ is small, and therefore the gain M is set to be small. As a result, the roughness in the region can be restricted, and a reproduced image having better image quality can be obtained.

The aforesaid embodiment, in which the gain is changed in accordance with the correlation value, and the technique described in Japanese Patent Application Publication No. 3 (1991)-502975, in which the gain is changed in accordance with the variance, will hereinbelow be compared with each other.

Figure 15:
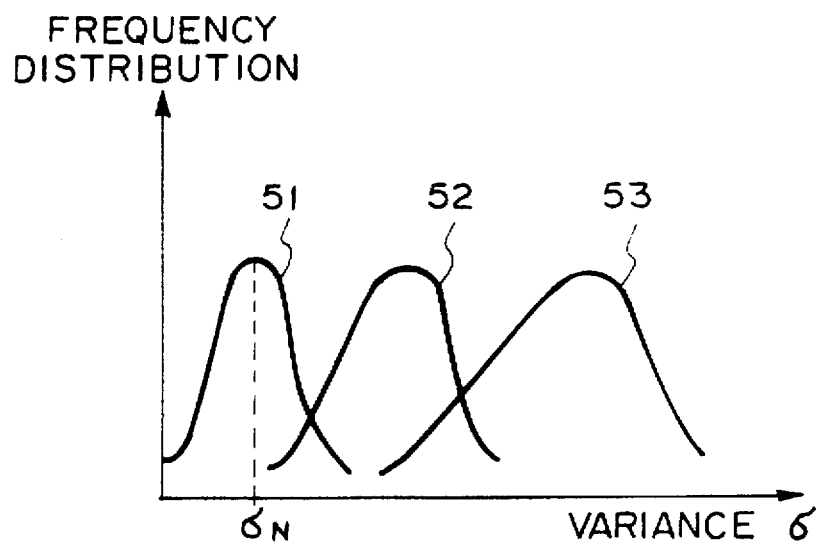
FIG. 15 is a graph showing local area limited variance values of a flat portion, a texture portion, and an edge portion of an image.
Figure 16:
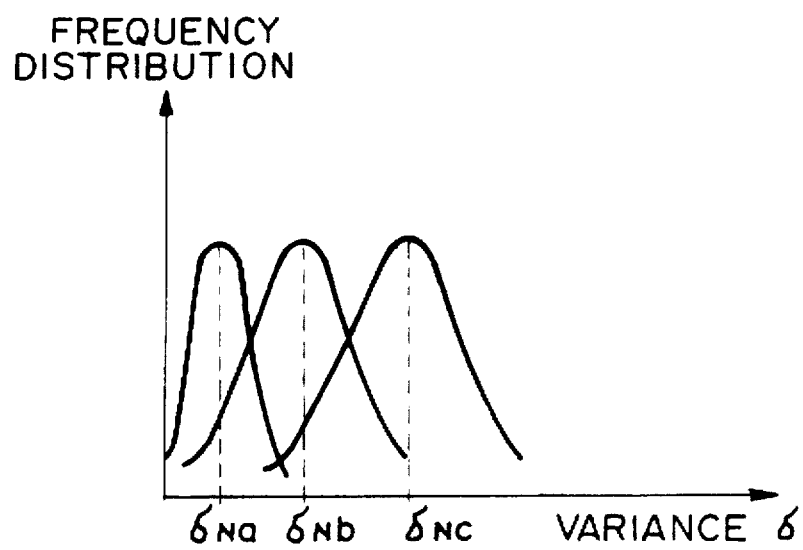
FIG. 16 is a graph showing local area limited variance values of a flat portion of an image, which vary for different kinds of film.

With the technique described in Japanese Patent Application Publication No. 3 (1991)-502975, local area limited variance values, which are plotted with respect to the frequency of occurrence, are calculated as for a flat portion of the image, in which the level of noise due to the film graininess is high, a texture portion of the image, and an edge portion of the image. The value of the coefficient K, which is used in the formula for the unsharp mask processing, $$S' = S_{org} + K \cdot (S_{org} - S_{us})$$

is set as functions of the local area limited variance values. Specifically, as for an ordinary image, the local area limited variance values of the flat portion, the texture portion, and the edge portion of the image respectively take values 51, 52, and 53 shown in FIG. 15. When only the local area limited variance values $\sigma_N$ of the image signal corresponding to the flat portion are considered, as illustrated in FIG. 16, the local area limited variance values $\sigma_N$ fluctuate among variances $\sigma_{Na}$, $\sigma_{Nb}$, and $\sigma_{Nc}$ in accordance with the level of the film graininess. More specifically, the value of the peak of the variance $\sigma$ becomes large when the level of the film graininess becomes high. (In FIG. 16, $\sigma_{Na}$ represents the variance of low-sensitivity film having a low level of film graininess, $\sigma_{Nb}$ represents the variance of middle-sensitivity film having a middle level of film graininess, and $\epsilon_{Nc}$ represents the variance of high-sensitivity film having a high level of film graininess.) In this manner, the variance value of the image signal varies for different level of film graininess. Also, it becomes difficult to separate the variance of the flat portion and the variance of the texture portion from each other, depending upon the film graininess. Therefore, the gain setting cannot be kept simple.

Figure 17:
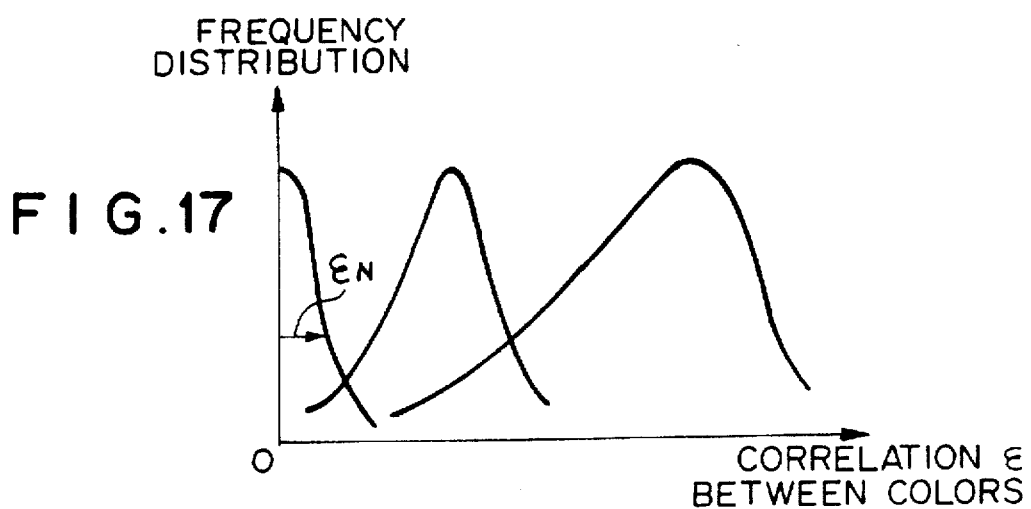
FIG. 17 is a graph showing how correlation values of a flat portion, a texture portion, and an edge portion of an image are distributed.
Figure 18:
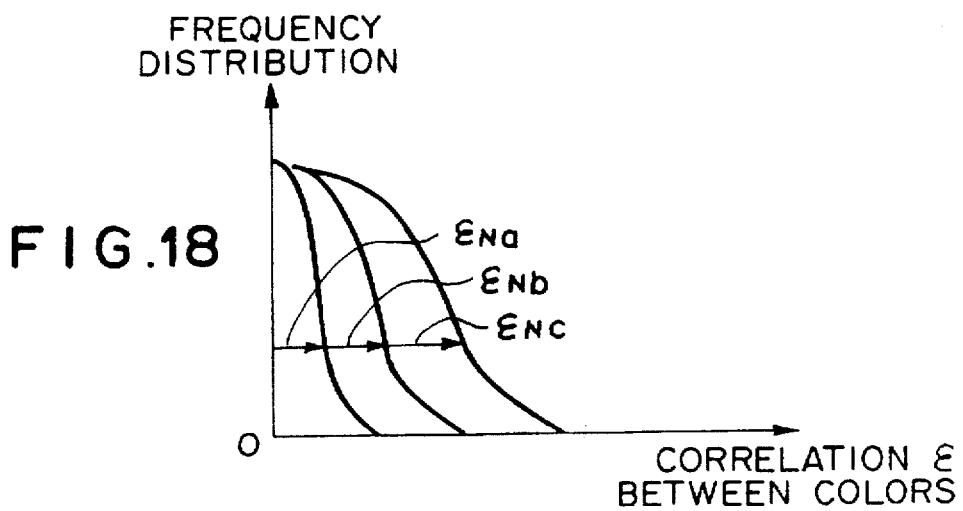
FIG. 18 is a graph showing how correlation values of a flat portion of an image are distributed, depending upon the kinds of film.
Figure 19:
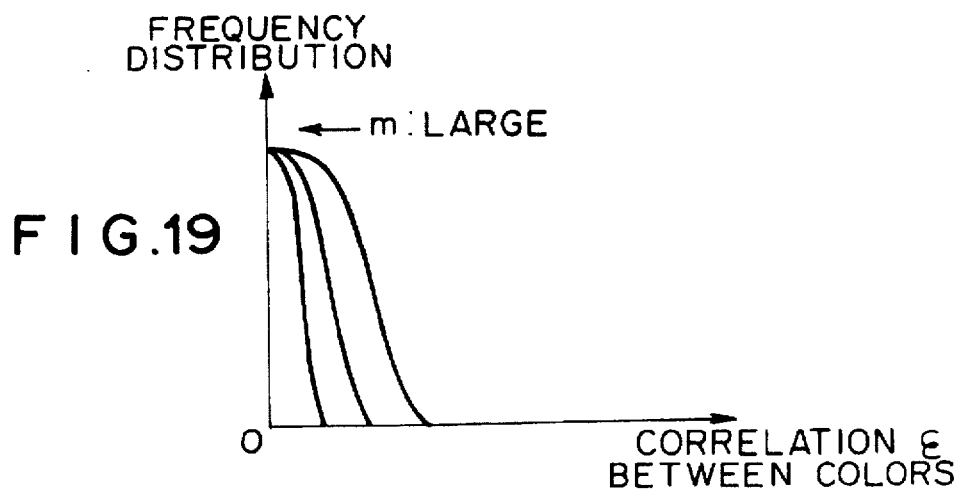
FIG. 19 is a graph showing how correlation values of a flat portion of an image are distributed, depending upon the value of m.

As illustrated in FIG. 17, the distributions of the correlation values are similar to those of the variances. However, the value of the peak of the correlation values $\epsilon_N$ with respect to the flat portion of the image is always equal to zero regardless of the level of the film graininess. Specifically, as illustrated in FIG. 18, for all of different levels of graininess, the values of the peaks of the correlation values become equal to zero, and only the magnitudes of base portions $\epsilon_{Na}$, $\epsilon_{Nb}$, and $\epsilon_{Nc}$ of the distribution patterns vary. Also, as illustrated in FIG. 19, when the value of m in Formula (3) is increased, the number of data becomes large, and the variations of the correlation values become small. Therefore, the base portions can be rendered small. Accordingly, in cases where the value of the gain with respect to each region of the image is calculated in accordance with the correlation value, the separation of the flat portion, the texture portion, and the edge portion becomes easier than when the value of the gain is calculated from the variance. As a result, the value of the gain in accordance with the color of the region of the image can be obtained. When the value of m in Formula (3) is large, the correlation value can be calculated more accurately.

Figure 20:
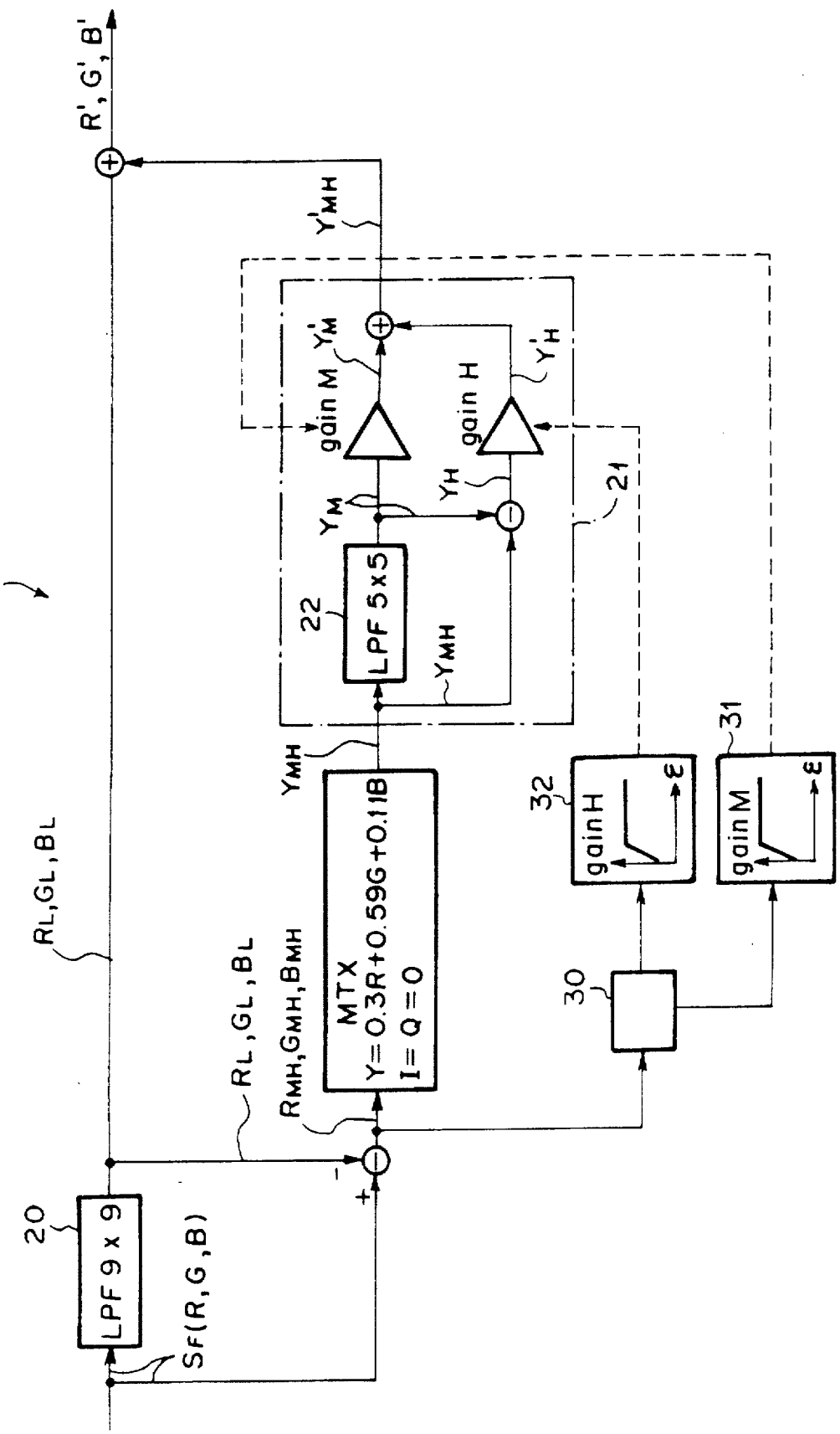
FIG. 20 is a block diagram showing a modification of the third embodiment of the image processing apparatus in accordance with the present invention, wherein a gain H is changed in accordance with a correlation value.

In the third embodiment described above, the value of the gain M, by which the middle frequency components $Y_M$ of the luminance components $Y_{MH}$ are to be multiplied, is changed in accordance with the correlation value $\epsilon$ among the red, green, and blue three colors, which is calculated from the middle and high frequency components $R_{MH}$, $G_{MH}$, and $B_{MH}$ of the fine scanning image signals $S_F$(R, G, B). Alternatively, the value of the gain H, by which the high frequency components $Y_H$ of the luminance components $Y_{MH}$ are to be multiplied, may also be changed in accordance with the correlation value $\epsilon$. Specifically, as illustrated in FIG. 20, a look-up table 32 for the gain H may be provided. In cases where the correlation value $\epsilon$ among the colors is smaller than a predetermined threshold value, the degree of emphasis of the high frequency component corresponding to the picture element, which is associated with the correlation value smaller than the predetermined threshold value, may be set to be lower than the degree of emphasis of the high frequency components corresponding to the other picture elements. In this manner, it is possible to prevent the problems from occurring in that, in cases where the degree of emphasis of the high frequency components is set to be high, the graininess due to the luminance components is emphasized in the flat portion of the image.

Also, in the third embodiment described above, the values of the gain M and the gain H are changed in accordance with the correlation value $\epsilon$, which is the sum of the correlation values $\epsilon_{RG}$, $\epsilon_{GB}$, and $\epsilon_{BR}$ among the colors. Alternatively, the values of the gain M and the gain H may be changed in accordance with the one of the correlation values $\epsilon_{RG}$, $\epsilon_{GB}$, and $\epsilon_{BR}$, or in accordance with the sum of two of them. (in such cases, the accuracy will become slightly low.) In this manner, the calculations of the correlation values can be simplified, and the scale of the processing apparatus can be kept small.

In the embodiments described above, the middle and high frequency components $R_{MH}$, $G_{MH}$, and $B_{MH}$ are converted to the YIQ base, and the gain processing is then carried out. However, the conversion to the YIQ base need not necessarily be carried out. For example, the middle and high frequency components $R_{MH}$, $G_{MH}$, and $B_{MH}$ may be separated into the middle frequency components $R_M$, $G_M$, $B_M$ and the high frequency components $R_H$, $G_H$, $B_H$. The gain processing may then be carried without the respective components being converted to the YIQ base. However, the gain processing should preferably be carried out in accordance with only the luminance components after the conversion to the YIQ base. In such cases, the roughness due to the film graininess can be restricted markedly.

Further, in the third embodiment described above, the values of the gain M and the gain H are changed in accordance with the correlation value $\epsilon$. Therefore, the separation of the flat portion, the texture portion, and the edge portion becomes easier than when the value of the gain is calculated from the variance. As a result, the value of the gain in accordance with the color of the region of the image can be obtained. However, as illustrated in FIG. 21, even if the correlation value $\epsilon$ is utilized, the flat portion and the edge portion cannot be clearly separated from each other. As a result, as for the portion (hatched in FIG. 21) at which the distribution of the correlation value $\epsilon$ with respect to the flat portion and the distribution of the correlation value $\epsilon$ with respect to the edge portion overlap one upon the other, unnecessary processing is carried out (such that, for example, the edge portion may be restricted and the flat portion may be emphasized). In such cases, as for this portion, the graininess components associated with a comparatively large rating value remain unrestricted, and the graininess becomes spatially non-dense. In order to eliminate the problems described above, as illustrated in FIG. 22, the correlation values $\epsilon_{RG}$, $\epsilon_{GB}$, and $\epsilon_{BR}$ are subjected to the filter processing with median filters 40, 40, 40, and local noise of the correlation values $\epsilon_{RG}$, $\epsilon_{GB}$, and $\epsilon_{BR}$ are thereby eliminated. As a result, as illustrated in FIG. 23, the width of the distribution of the correlation values can be kept small. Accordingly, the separation of the flat portion and the edge portion from each other can be rendered clear. In this manner, it becomes possible to prevent the problems from occurring in that unnecessary processing is carried out with respect to the portion, at which the distribution of the correlation value $\epsilon$ with respect to the flat portion and the distribution of the correlation value $\epsilon$ with respect to the edge portion overlap one upon the other, and in that only a high level of graininess becomes spatially non-dense.

Figure 22:
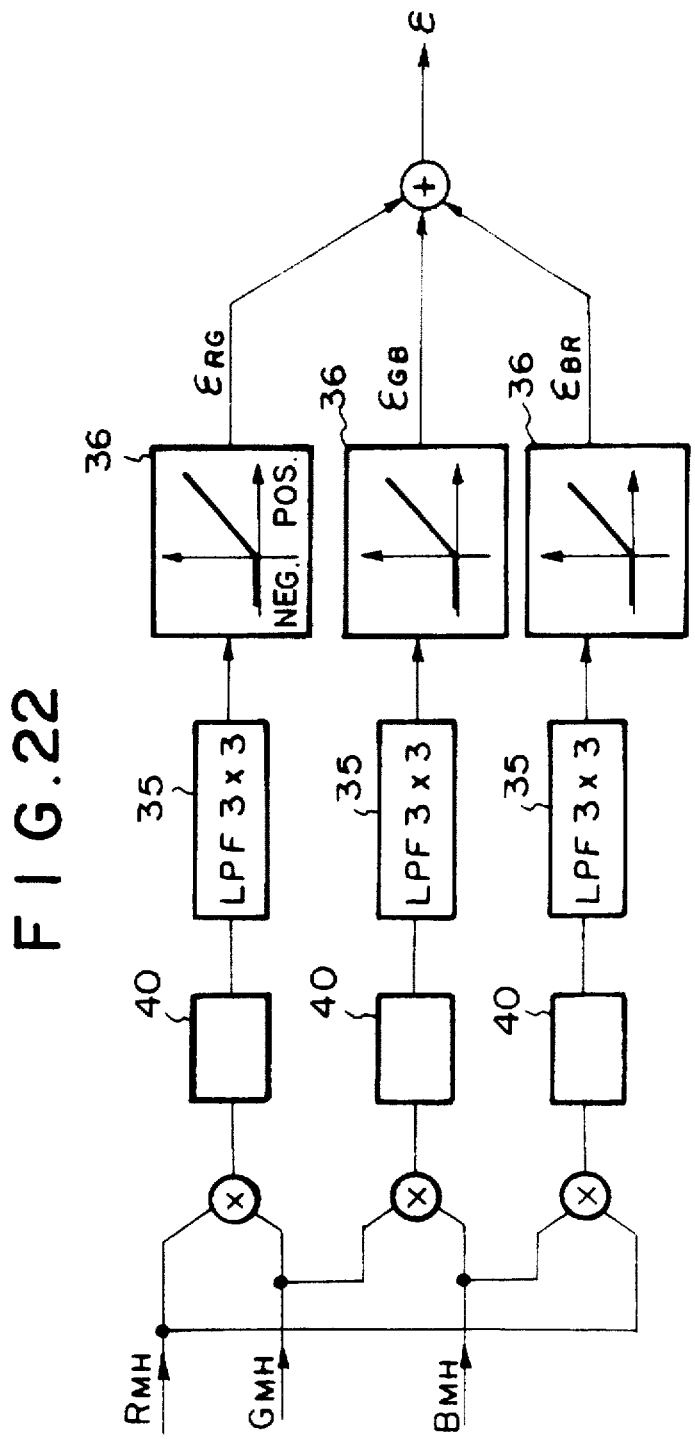
FIG. 22 is a block diagram showing how filter processing with a median filter is carried out on correlation values.

In cases where the constitution of FIG. 22 is employed, the width of the distribution of the correlation values can be kept small by the median filters 40, 40, 40. In such cases, in lieu of the correlation values, the variance values described in Japanese Patent Application Publication No. 3(1991)-502975 may be employed. Also when the variance values are employed, the distribution of the variance values can be kept small. Therefore, in the same manner as that when the correlation values are employed, in cases where the variance values are employed, it becomes possible to prevent the problems from occurring in that unnecessary processing is carried out with respect to the portion, at which the distribution of the variance values with respect to the flat portion and the distribution of the variance values with respect to the edge portion overlap one upon the other, and in that the graininess becomes spatially non-dense.

Furthermore, in the third embodiment described above, such that the distribution of the frequency components corresponding to the flat portion and the distribution of the frequency components corresponding to the edge portion can be separated more easily, the calculation of the middle frequency components $Y_M$ and/or the high frequency components $Y_H$, for which the gain is set, and the calculation of the correlation value may be carried out respectively in accordance with different colors, which are among red, green, and blue three colors. For example, the middle and high frequency components $Y_{MH}$ of the luminance components may be calculated in accordance with the green middle and high frequency components $G_{MH}$. Also, as for the correlation value, the correlation value $\epsilon_{BR}$ between the middle and high frequency components $R_{MH}$ and $B_{MH}$, which are of red and blue, may be calculated and used. The calculations are carried out with Formulas (6) and (7).

$$Y_{MH}=G_{MH} \tag{6}$$

$$\epsilon_{BR}=E\ (R_{MH}, B_{MH}) \tag{7}$$

In this manner, the calculation of the middle frequency components $Y_M$ and/or the high frequency components $Y_H$, which are subjected to the emphasis and restriction processing, and the calculation of the correlation value $\epsilon_{BR}$ may be carried out respectively in accordance with different colors, which are among red, green, and blue three colors. In such cases, the middle and high frequency components $Y_{MH}$ and the correlation value $\epsilon_{BR}$ are calculated from statistically independent information, and therefore the variations of the distributions of them become different from each other. Accordingly, the distribution of the middle and high frequency components $Y_{MH}$ and the distribution of the correlation value $\epsilon_{BR}$ are not affected by each other, and the emphasis and restriction processing can be carried out without being affected by the distribution of the correlation value $\epsilon_{BR}$. As a result, high-level graininess portions of the middle and high frequency components $Y_{MH}$ can be prevented from being emphasized, and it becomes possible to prevent the problems from occurring in that the graininess components associated with a comparatively large rating value become spatially non-dense and remain in the image.

In such cases, in lieu of the correlation value, the variance value described in Japanese Patent Application Publication No. 3(1991)-502975 may be employed. Also when the variance value is employed, the distribution of the variance value and the distribution of the high frequency components can be obtained such that they may not be affected by each other. Therefore, in the same manner as that when the correlation value is employed, in cases where the variance value is employed, it becomes possible to prevent the problems from occurring in that unnecessary processing is carried out with respect to the portion, at which the distribution of the variance value with respect to the flat portion and the distribution of the variance value with respect to the edge portion overlap one upon the other, and in that the graininess becomes spatially non-dense. In such cases, the high frequency components are calculated with Formula (6) shown above, and the variance value is calculated with Formula (8) shown below.

$$\sigma = \sigma_{RH}^2 + \sigma_{BH}^2 \qquad (8)$$

wherein $\sigma_{RH}$ represents the variance value of the red high frequency components, and $\sigma_{BH}$ represents the variance value of the blue high frequency components.

Figure 24:
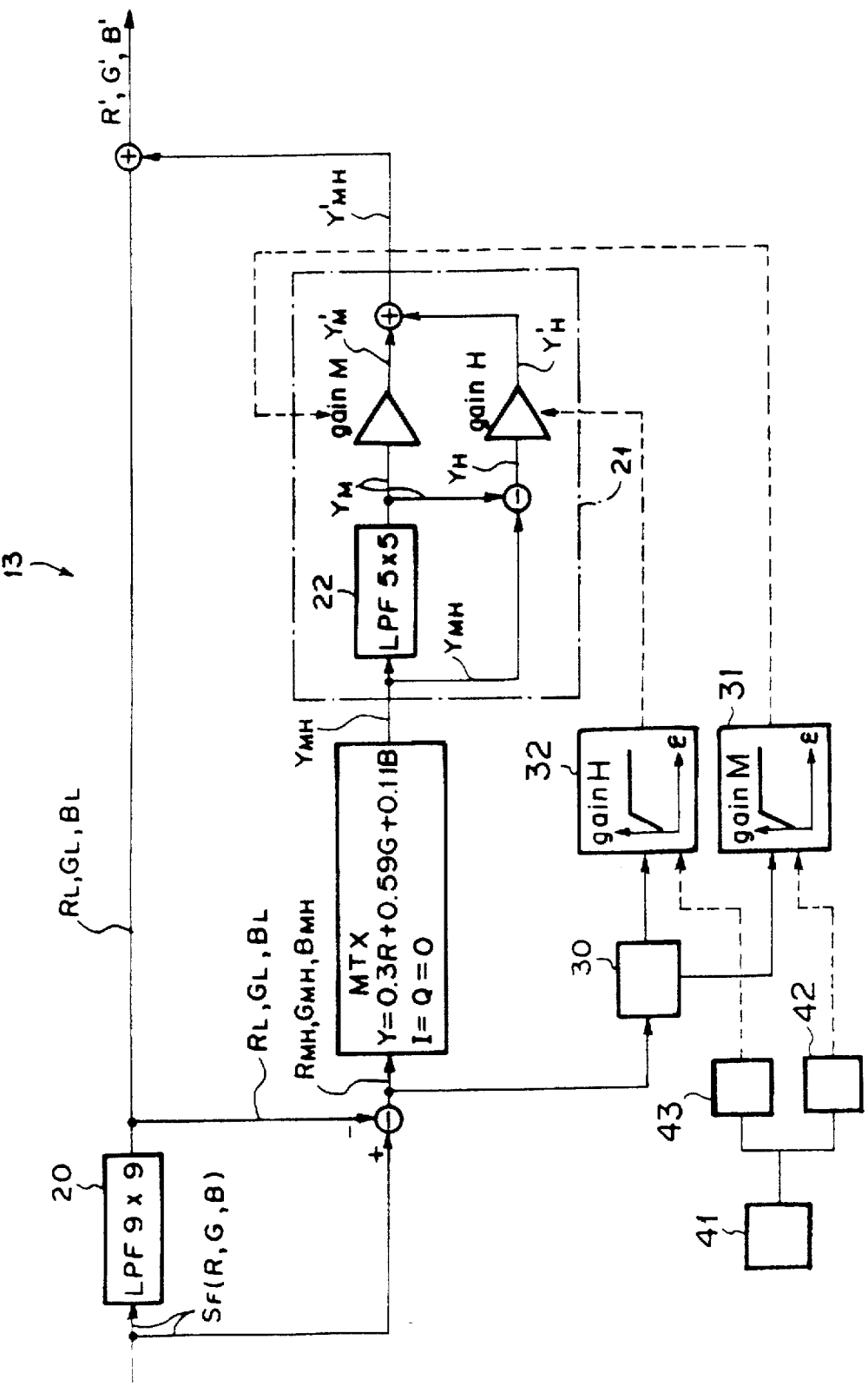
FIG. 24 is a block diagram showing a fourth embodiment of the image processing apparatus in accordance with the present invention.

Furthermore, each time the emphasis and restriction processing is carried out, the degrees of the emphasis and the restriction in the emphasis and restriction processing may be calculated in accordance with the image reproducing conditions, such as the kind of the recording medium on which the given image was recorded, the size of the print on which the visible image is reproduced, or a correction amount which is specified by an operator. However, in such cases, the algorithm for calculating the degrees of the emphasis and the restriction cannot be kept simple, and a device for the calculation cannot be kept simple. Therefore, in a fourth embodiment of the image processing apparatus in accordance with the present invention, which is illustrated in FIG. 24, a plurality of the emphasis and restriction processing conditions in accordance with the image reproducing conditions are prepared previously for each of the middle frequency components and the high frequency components. The plurality of the emphasis and restriction processing conditions for the middle frequency components and the high frequency components are stored in memories 42 and 43. Also, the image reproducing conditions, such as the kind of the recording medium, the size of the print, or the correction amount, are specified from a reproducing condition input means 41. In this manner, predetermined emphasis and restriction processing conditions are selected from the plurality of the emphasis and restriction processing conditions, which are stored in the memories 42 and 43, and the emphasis and restriction processing is carried out in accordance with the selected conditions. In such cases, the image processing apparatus can be kept simple, and the time required to carry out the processing can be kept short. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing method for carrying out processing on an image signal, which represents a given image, comprising the steps of:
   i) separating the image signal into low frequency components, middle frequency components, and high frequency components,
   ii) carrying out emphasis and restriction processing, with which said high frequency components are emphasized and said middle frequency components are restricted, and
   iii) combining said high frequency components and said middle frequency components, which have been obtained from said emphasis and restriction processing, and said low frequency components with one another, a processed image signal being thereby obtained.

2. The method as defined in claim 1, further comprising:
   extracting luminance components, after said separating, from said high frequency components and said middle frequency components; and
   performing said emphasis and restriction processing and said combining in accordance with only said luminance components.

3. The method as defined in claim 1, further comprising:
   extracting a specific color region from the image signal, and
   said emphasis and restriction processing including further restricting said middle frequency components, which correspond to said specific color region.

4. The method as defined in claim 2, further comprising:
   extracting a specific color region from the image signal; and
   said emphasis and restriction processing including further restricting said middle frequency components, which correspond to said specific color region.

5. The method as defined in claim 1 further comprising:
   after said separating, calculating a rating value of said middle frequency components and/or said high frequency components; and
   said emphasis and restriction processing further include restricting the middle frequency components corresponding to picture elements, which are associated with the rating values smaller than a predetermined threshold value, more than the middle frequency components corresponding to picture elements, which are associated with the rating values larger than the predetermined threshold value.

6. The method as defined in claim 2 further comprising:
   calculating, after said separating, a rating value of said middle frequency components and/or said high frequency components; and
   said emphasis and restriction processing further include restricting the middle frequency components corresponding to picture elements, which are associated with the rating values smaller than a predetermined threshold value, more than the middle frequency components corresponding to picture elements, which are associated with the rating values larger than the predetermined threshold value.

7. The method as defined in claim 5, wherein said emphasis and restriction processing includes emphasizing the high frequency components corresponding to the picture elements, which are associated with the rating values smaller than the predetermined threshold value, less than the high frequency components corresponding to the picture elements, which are associated with the rating values larger than the predetermined threshold value.

8. The method as defined in claim 6, wherein said emphasis and restriction processing includes emphasizing the high frequency components corresponding to the picture elements, which are associated with the rating values smaller than the predetermined threshold value, less than the high frequency components corresponding to the picture elements, which are associated with the rating values larger than the predetermined threshold value.

9. The method as defined in claim 5, wherein said calculating of the rating value includes determining a correlation value between at least a single set of two colors, which are among red, green, and blue three colors, said correlation value being calculated from said middle frequency components and/or said high frequency components, which are of the respective colors and correspond to the same picture element.

10. The method as defined in claim 6, wherein said calculating of the rating value includes determining a correlation value between at least a single set of two colors, which are among red, green, and blue three colors, said correlation value being calculated from said middle frequency components and/or said high frequency components, which are of the respective colors and correspond to the same picture element.

11. The method as defined in claim 7, wherein said calculating of the rating value includes determining a correlation value between at least a single set of two colors, which are among red, green, and blue three colors, said correlation value being calculated from said middle frequency components and/or said high frequency components, which are of the respective colors and correspond to the same picture element.

12. The method as defined in claim 8, wherein said calculating of the rating value includes determining a correlation value between at least a single set of two colors, which are among red, green, and blue three colors, said correlation value being calculated from said middle frequency components and/or said high frequency components, which are of the respective colors and correspond to the same picture element.

13. The method as defined in claim 5 further comprising subjecting said rating value to a filter processing with a median filter, and thereafter said emphasis and restriction processing is carried out by using said predetermined threshold value and in accordance with said rating value, which has been obtained from said filter processing with said median filter.

14. The method as defined in claim 6 further comprising subjecting said rating value to a filter processing with a median filter, and thereafter said emphasis and restriction processing is carried out by using said predetermined threshold value and in accordance with said rating value, which has been obtained from said filter processing with said median filter.

15. The method as defined in claim 7 further comprising subjecting said rating value to a filter processing with a median filter, and thereafter said emphasis and restriction processing is carried out by using said predetermined threshold value and in accordance with said rating value, which has been obtained from said filter processing with said median filter.

16. The method as defined in claim 8 further comprising subjecting said rating value to a filter processing with a median filter, and thereafter said emphasis and restriction processing is carried out by using said predetermined threshold value and in accordance with said rating value, which has been obtained from said filter processing with said median filter.

17. The method as defined in claim 9 further comprising subjecting said rating value to a filter processing with a median filter, and thereafter said emphasis and restriction processing is carried out by using said predetermined threshold value and in accordance with said rating value, which has been obtained from said filter processing with said median filter.

18. The method as defined in claim 10 further comprising subjecting said rating value to a filter processing with a median filter, and thereafter said emphasis and restriction processing is carried out by using said predetermined threshold value and in accordance with said rating value, which has been obtained from said filter processing with said median filter.

19. The method as defined in claim 11 further comprising subjecting said rating value to a filter processing with a median filter, and thereafter said emphasis and restriction processing is carried out by using said predetermined threshold value and in accordance with said rating value, which has been obtained from said filter processing with said median filter.

20. The method as defined in claim 12 further comprising subjecting said rating value to a filter processing with a median filter, and thereafter said emphasis and restriction processing is carried out by using said predetermined threshold value and in accordance with said rating value, which has been obtained from said filter processing with said median filter.

21. The method as defined in claim 5, wherein said processing of said middle frequency components and/or said high frequency components and said calculating of said rating value are carried out respectively in accordance with different colors, which are among red, green, and blue three colors.

22. The method as defined in claim 6, wherein said processing of said middle frequency components and/or said high frequency components and said calculating of said rating value are carried out respectively in accordance with different colors, which are among red, green, and blue three colors.

23. The method as defined in claim 7, wherein said processing of said middle frequency components and/or said high frequency components and said calculating of said rating value are carried out respectively in accordance with different colors, which are among red, green, and blue three colors.

24. The method as defined in claim 8, wherein said processing of said middle frequency components and/or said high frequency components and said calculating of said rating value are carried out respectively in accordance with different colors, which are among red, green, and blue three colors.

25. The method as defined in claim 9, wherein said processing of said middle frequency components and/or said high frequency components and said calculating of said rating value are carried out respectively in accordance with different colors, which are among red, green, and blue three colors.

26. The method as defined in claim 10, wherein said processing of said middle frequency components and/or said high frequency components and said calculating of said rating value are carried out respectively in accordance with different colors, which are among red, green, and blue three colors.

27. The method as defined in claim 11, wherein said processing of said middle frequency components and/or said high frequency components and said calculating of said rating value are carried out respectively in accordance with different colors, which are among red, green, and blue three colors.

28. The method as defined in claim 12, wherein said processing of said middle frequency components and/or said high frequency components and said calculating of said rating value are carried out respectively in accordance with different colors, which are among red, green, and blue three colors.

29. The method as defined in claim 1, further comprising:
determining degrees of the emphasis and the restriction in said emphasis and restriction processing by selecting from a plurality of emphasis and restriction processing conditions, which have been determined previously in accordance with image reproducing conditions in the reproduction of a visible image from said processed image signal.

30. The method as defined in claim 1, wherein said emphasis and restriction processing includes multiplying said high frequency components by a first uniform factor and multiplying said middle frequency components by a second uniform factor which is less than said first uniform factor.

31. The method as defined in claim 1, wherein said emphasis and restriction processing includes emphasizing all of said high frequency components and restricting all of said middle frequency components.

32. An image processing apparatus for carrying out processing on an image signal, which represents a given image, comprising:
i) a separation means for separating the image signal into low frequency components, middle frequency components, and high frequency components,
ii) an emphasis and restriction processing means for carrying out emphasis and restriction processing, with which said high frequency components are emphasized and said middle frequency components are restricted, and
iii) a composition means for combining said high frequency components and said middle frequency components, which have been obtained from said emphasis and restriction processing, and said low frequency components with one another, a processed image signal being thereby obtained.

33. An apparatus as defined in claim 32 wherein the apparatus further comprises a luminance components extracting means which, after said separation by said separation means, extracts luminance components from said high frequency components and said middle frequency components, and
said emphasis and restriction processing means and said composition means respectively carry out said emphasis and restriction processing and said combining in accordance with only said luminance components.

34. An apparatus as defined in claim 32, wherein the apparatus further comprises a region extracting means for extracting a specific color region from the given image, and
said emphasis and restriction processing means carries out said emphasis and restriction processing including further restricting said middle frequency components, which correspond to said specific color region.

35. An apparatus as defined in claim 33 wherein the apparatus further comprises a region extracting means for extracting a specific color region from the given image, and
said emphasis and restriction processing means carries out said emphasis and restriction processing including further restricting said middle frequency components, which correspond to said specific color region.

36. The apparatus as defined in claim 32 wherein the apparatus further comprises a rating value calculating means which, after said separation by said separation means, calculates a rating value of said middle frequency components and/or said high frequency components, and
said emphasis and restriction processing means carries out said emphasis and restriction processing including restricting the middle frequency components corresponding to picture elements, which are associated with the rating values smaller than a predetermined threshold value, more than the middle frequency components corresponding to picture elements, which are associated with the rating values larger than the predetermined threshold value.

37. The apparatus as defined in claim 33 wherein the apparatus further comprises a rating value calculating means which, after said separation by said separation means, calculates a rating value of said middle frequency components and/or said high frequency components, and
said emphasis and restriction processing means carries out said emphasis and restriction processing including restricting the middle frequency components corresponding to picture elements, which are associated with the rating values smaller than a predetermined threshold value, more than the middle frequency components corresponding to picture elements, which are associated with the rating values larger than the predetermined threshold value.

38. The apparatus as defined in claim 36, wherein said emphasis and restriction processing means carries out said emphasis and restriction processing including emphasizing the high frequency components corresponding to the picture elements, which are associated with the rating values smaller than the predetermined threshold value, less than the high frequency components corresponding to the picture elements, which are associated with the rating values larger than the predetermined threshold value.

39. The apparatus as defined in claim 37, wherein said emphasis and restriction processing means carries out said emphasis and restriction processing including emphasizing the high frequency components corresponding to the picture elements, which are associated with the rating values smaller than the predetermined threshold value, less than the high frequency components corresponding to the picture elements, which are associated with the rating values larger than the predetermined threshold value.

40. An apparatus as defined in claim 36 wherein said rating value calculating means calculates a correlation value between at least a single set of two colors, which are among red, green, and blue three colors, said correlation value being calculated from said middle frequency components and/or said high frequency components, which are of the respective colors and correspond to the same picture element.

41. An apparatus as defined in claim 37 wherein said rating value calculating means calculates a correlation value between at least a single set of two colors, which are among red, green, and blue three colors, said correlation value being calculated from said middle frequency components and/or said high frequency components, which are of the respective colors and correspond to the same picture element.

42. An apparatus as defined in claim 38 wherein said rating value calculating means calculates a correlation value between at least a single set of two colors, which are among red, green, and blue three colors, said correlation value being calculated from said middle frequency components and/or said high frequency components, which are of the respective colors and correspond to the same picture element.

43. An apparatus as defined in claim 39 wherein said rating value calculating means calculates a correlation value between at least a single set of two colors, which are among red, green, and blue three colors, said correlation value being calculated from said middle frequency components and/or said high frequency components, which are of the respective colors and correspond to the same picture element.

44. The apparatus as defined in claim 36, wherein said rating value calculating means includes a median filter for filtering said rating value, and said emphasis and restriction processing means carries out said emphasis and restriction processing using said predetermined threshold value and in accordance with said rating value, which has been obtained from said median filter.

45. The apparatus as defined in claim 37, wherein said rating value calculating means includes a median filter for filtering said rating value, and said emphasis and restriction processing means carries out said emphasis and restriction processing using said predetermined threshold value and in accordance with said rating value, which has been obtained from said median filter.

46. The apparatus as defined in claim 38, wherein said rating value calculating means includes a median filter for filtering said rating value, and said emphasis and restriction processing means carries out said emphasis and restriction processing using said predetermined threshold value and in accordance with said rating value, which has been obtained from said median filter.

47. The apparatus as defined in claim 39, wherein said rating value calculating means includes a median filter for filtering said rating value, and said emphasis and restriction processing means carries out said emphasis and restriction processing using said predetermined threshold value and in accordance with said rating value, which has been obtained from said median filter.

48. The apparatus as defined in claim 40, wherein said rating value calculating means includes a median filter for filtering said rating value, and said emphasis and restriction processing means carries out said emphasis and restriction processing using said predetermined threshold value and in accordance with said rating value, which has been obtained from said median filter.

49. The apparatus as defined in claim 41, wherein said rating value calculating means includes a median filter for filtering said rating value, and said emphasis and restriction processing means carries out said emphasis and restriction processing using said predetermined threshold value and in accordance with said rating value, which has been obtained from said median filter.

50. The apparatus as defined in claim 42, wherein said rating value calculating means includes a median filter for filtering said rating value, and said emphasis and restriction processing means carries out said emphasis and restriction processing using said predetermined threshold value and in accordance with said rating value, which has been obtained from said median filter.

51. The apparatus as defined in claim 43, wherein said rating value calculating means includes a median filter for filtering said rating value, and said emphasis and restriction processing means carries out said emphasis and restriction processing using said predetermined threshold value and in accordance with said rating value, which has been obtained from said median filter.

52. The apparatus as defined in claim 36, wherein said separation means and said rating value calculating means respectively carry out the calculation of said middle frequency components and/or said high frequency components and the calculation of said rating value in accordance with different colors, which are among red, green, and blue three colors.

53. The apparatus as defined in claim 37, wherein said separation means and said rating value calculating means respectively carry out the calculation of said middle frequency components and/or said high frequency components and the calculation of said rating value in accordance with different colors, which are among red, green, and blue three colors.

54. The apparatus as defined in claim 38, wherein said separation means and said rating value calculating means respectively carry out the calculation of said middle frequency components and/or said high frequency components and the calculation of said rating value in accordance with different colors, which are among red, green, and blue three colors.

55. The apparatus as defined in claim 39, wherein said separation means and said rating value calculating means respectively carry out the calculation of said middle frequency components and/or said high frequency components and the calculation of said rating value in accordance with different colors, which are among red, green, and blue three colors.

56. The apparatus as defined in claim 40, wherein said separation means and said rating value calculating means respectively carry out the calculation of said middle frequency components and/or said high frequency components and the calculation of said rating value in accordance with different colors, which are among red, green, and blue three colors.

57. The apparatus as defined in claim 41, wherein said separation means and said rating value calculating means respectively carry out the calculation of said middle frequency components and/or said high frequency components and the calculation of said rating value in accordance with different colors, which are among red, green, and blue three colors.

58. The apparatus as defined in claim 42, wherein said separation means and said rating value calculating means respectively carry out the calculation of said middle frequency components and/or said high frequency components and the calculation of said rating value in accordance with different colors, which are among red, green, and blue three colors.

59. The apparatus as defined in claim 43, wherein said separation means and said rating value calculating means respectively carry out the calculation of said middle frequency components and/or said high frequency components and the calculation of said rating value in accordance with different colors, which are among red, green, and blue three colors.

60. The apparatus as defined in claim 32, wherein said emphasis and restriction processing means includes a memory for storing a plurality of emphasis and restriction processing conditions, which have been determined previously in accordance with image reproducing conditions in the reproduction of a visible image from said processed image signal, and a selection means for selecting predetermined emphasis and restriction processing conditions from said memory in accordance with image reproducing conditions and thereby determining the degrees of the emphasis and the restriction in said emphasis and restriction processing.

61. The apparatus as defined in claim 32, wherein said emphasis and restriction processing means includes a multiplier for multiplying said high frequency components by a first uniform factor and multiplying said middle frequency components by a second uniform factor which is less than said first uniform factor.

62. The apparatus as defined in claim 32, wherein said emphasis and restriction processing means includes means for emphasizing all of said high frequency components and restricting all of said middle frequency components.

* * * * *